United States Patent
Zorin et al.

(10) Patent No.: US 11,334,593 B2
(45) Date of Patent: May 17, 2022

(54) AUTOMATED ETL WORKFLOW GENERATION

(71) Applicant: INTERNATIONAL BUSINESS MACHINES CORPORATION, Armonk, NY (US)

(72) Inventors: Anton Zorin, Waedenswil (CH); Abderrahim Labbi, Gattikon (CH)

(73) Assignee: International Business Machines Corporation, Armonk, NY (US)

( * ) Notice: Subject to any disclaimer, the term of this patent is extended or adjusted under 35 U.S.C. 154(b) by 162 days.

(21) Appl. No.: 16/985,268

(22) Filed: Aug. 5, 2020

(65) Prior Publication Data

US 2022/0043826 A1    Feb. 10, 2022

(51) Int. Cl.
| | |
|---|---|
| *G06F 16/25* | (2019.01) |
| *G06F 16/2457* | (2019.01) |
| *G06F 16/28* | (2019.01) |
| *G06N 5/02* | (2006.01) |
| *G06F 16/23* | (2019.01) |
| *G06F 16/901* | (2019.01) |

(52) U.S. Cl.
CPC ........ *G06F 16/254* (2019.01); *G06F 16/2365* (2019.01); *G06F 16/24573* (2019.01); *G06F 16/288* (2019.01); *G06F 16/9024* (2019.01); *G06N 5/022* (2013.01); *G06N 5/025* (2013.01)

(58) Field of Classification Search
None
See application file for complete search history.

(56) References Cited

U.S. PATENT DOCUMENTS

| | | |
|---|---|---|
| 6,208,990 B1 | 3/2001 | Suresh et al. |
| 6,604,110 B1 | 8/2003 | Savage et al. |
| 7,788,255 B2 | 8/2010 | Sethi et al. |
| 8,024,369 B2 | 9/2011 | Pellegrini et al. |

(Continued)

FOREIGN PATENT DOCUMENTS

| | | |
|---|---|---|
| CN | 109739893 A | 5/2019 |
| CN | 109997126 A | 7/2019 |

(Continued)

OTHER PUBLICATIONS

Airflow Documentation, "Concepts—Airflow Documentation," https://airflow.apache.org/docs/stable/concepts.html#, Apache Airflow, The Apache Software Foundation, 2019, 30 pages.

(Continued)

*Primary Examiner* — Richard L Bowen
(74) *Attorney, Agent, or Firm* — Steven M. Bouknight

(57) ABSTRACT

The exemplary embodiments disclose a system and method, a computer program product, and a computer system. The exemplary embodiments may include receiving a data analysis request, using a knowledge graph for determining a source dataset based on the received data analysis request, wherein the knowledge graph represents an extract, transform and load (ETL) based ontology, wherein the knowledge graph comprises nodes representing entities and edges representing relationships between the entities, and wherein the entities are instances of concepts of the ETL based ontology, building an ETL workflow for processing the source dataset in accordance with a data lineage associated with the source dataset in the knowledge graph, and executing the ETL workflow.

20 Claims, 23 Drawing Sheets

(56) References Cited

U.S. PATENT DOCUMENTS

| | | | |
|---|---|---|---|
| 9,607,060 B2 | 3/2017 | Li | |
| 11,151,320 B1* | 10/2021 | Taylor | G06F 40/30 |
| 11,269,911 B1* | 3/2022 | Jones | G06N 20/00 |
| 2012/0154405 A1 | 6/2012 | Baumgartner | |
| 2014/0351261 A1 | 11/2014 | Aswani et al. | |
| 2017/0104627 A1 | 4/2017 | Bender et al. | |
| 2017/0286526 A1* | 10/2017 | Bar-Or | G06F 16/288 |

FOREIGN PATENT DOCUMENTS

| | | |
|---|---|---|
| CN | 110704528 A | 1/2020 |
| EP | 3611630 A1 | 2/2020 |
| EP | 3647965 A1 | 5/2020 |

OTHER PUBLICATIONS

APEXSQL.Com, "SQL Server Tools for DBAs and Developers—ApexSQL," QUEST Software, Inc., https://www.apexsql.com/sql-tools-analyze.aspx, 2020, 5 pages.

COLLIBRA.Com, "Defining Data Lineage—Collibra," Collibra, https://sqldep.com/, 2020, 7 pages.

Deneke, "A Domain Specific Model for Generating ETL Workflows from Business Intents", https://pdfs.semanticscholar.org/0e11/191dd45a526ff18feff3c1c499c44d166615.pdf?_ga-2.221255709.441997440.1582530297-743761151.1577338722, Aug. 2012, pp. 1-206.

Disclosed Anonymously, "Data Governance Lineage with Cloud Granularity", IEEE, IPCOM000259477D, Aug. 14, 2019, pp. 1-2.

Galkin et al., Enterprise Knowledge Graphs: A Backbone of Linked Enterprise Data, 10.1109/WI.2016.0083, 2016 IEEE, pp. 497-502.

IBM Corporation, "IBM DataStage," IBM Corporation, https://www.ibm.com/products/infosphere-datastage, Printed Jul. 31, 2020, 8 pages.

Mell et al., "The NIST Definition of Cloud Computing", National Institute of Standards and Technology, Special Publication 800-145, Sep. 2011, pp. 1-7.

Red-Gate.Com, "SQL Dependency Tracker: See SQL Server Object Dependencies,", Red Gate Software Ltd., https://www.red-gate.com/products/sql-development/sql-dependency-tracker/, 1999-2020, 5 pages.

Stardog Union, "Stardog Enterprise Knowledge Graph Platform," Stardog Union, https://www.stardog.com/platform/, 2020, 7 pages.

Timbr.Ai, "TimbrSQL Knowledge Graph," WP-Semantix Ltd. (timbr.ai), https://www.timbr.ai/timbr/, 2019-2020, 4 pages.

Tiwari, "ETL Workflow Modeling", Apr. 15, 2018, Data Engineering, https://www.abhishek-tiwari.com/etl-workflow-modeling/, pp. 1-6.

* cited by examiner

AUTOMATED ETL WORKFLOW GENERATION

BACKGROUND

The exemplary embodiments relate to the field of digital computer systems, and more specifically, to a method for an automated extract, transform and load (ETL) workflow generation.

In computing, ETL may be the general procedure of copying data from one or more source systems into a destination system which may represent the data differently from the source(s) or in a different context than the source(s). An ETL system may extract data from the source systems, enforce data quality and consistency standards, conform data so that separate source systems can be used together, and finally deliver data in a presentation-ready format so that application developers can build applications and end users can make decisions. However, such ETL system may only be accessible to experts, strongly limiting its potential impact.

SUMMARY

The exemplary embodiments disclose a system and method, a computer program product, and a computer system. The exemplary embodiments may include receiving a data analysis request, using a knowledge graph for determining a source dataset based on the received data analysis request, wherein the knowledge graph represents an extract, transform and load (ETL) based ontology, wherein the knowledge graph comprises nodes representing entities and edges representing relationships between the entities, and wherein the entities are instances of concepts of the ETL based ontology, building an ETL workflow for processing the source dataset in accordance with a data lineage associated with the source dataset in the knowledge graph, and executing the ETL workflow.

BRIEF DESCRIPTION OF THE SEVERAL VIEWS OF THE DRAWINGS

The following detailed description, given by way of example and not intended to limit the exemplary embodiments solely thereto, will best be appreciated in conjunction with the accompanying drawings, in which.

The drawings are not necessarily to scale. The drawings are merely schematic representations, not intended to portray specific parameters of the exemplary embodiments. The drawings are intended to depict only typical exemplary embodiments. In the drawings, like numbering represents like elements.

DETAILED DESCRIPTION OF THE SEVERAL VIEWS OF THE DRAWINGS

Figure 1A:
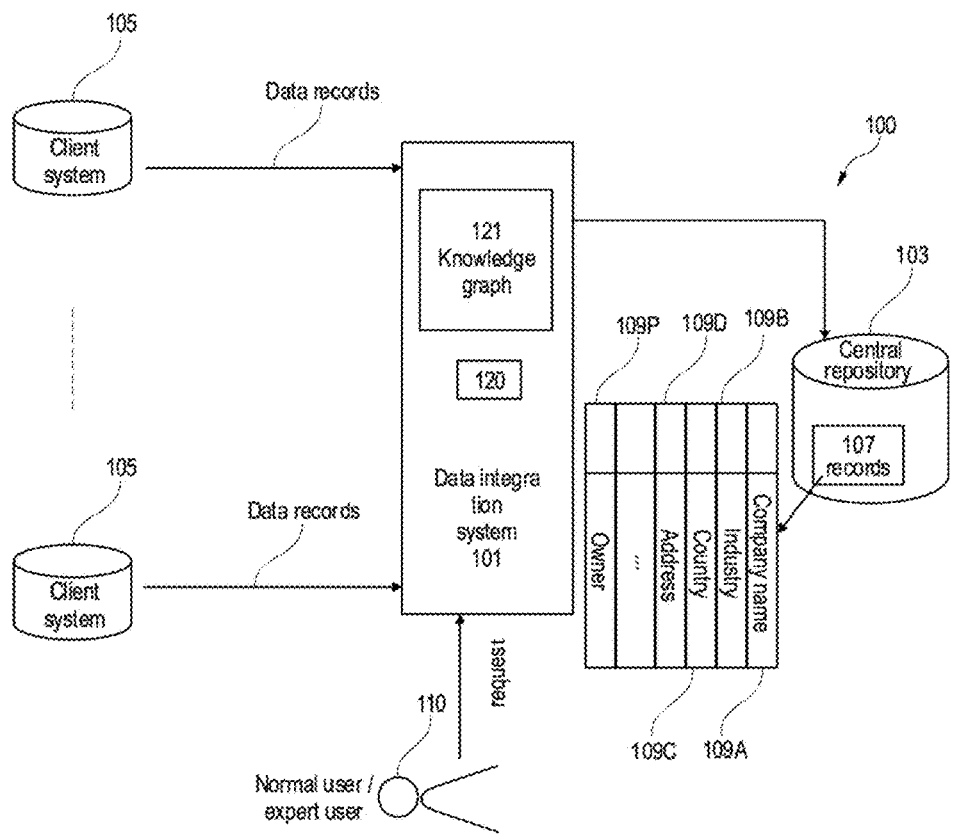
FIG. 1A is a block diagram of a computer system, in accordance with the exemplary embodiments.

The descriptions of the various embodiments of the present invention will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The ETL based ontology may encompass a representation, formal naming and definition of the categories, properties and relations between the concepts. The ETL based ontology may be provided by defining classes and class hierarchy of ETL related tasks. A class may be defined using general concepts of the ETL related tasks. A general concept may, for example, be a dataset. Subclasses may be defined based on the classes. For example, the dataset class may have subclasses that specialize the dataset. For example, a subclass may indicate user roles associated with the dataset, the data lineage used to process the dataset, etc. Each of the classes may be associated with properties descriptive of the concept of the class. The knowledge graph may represent concept terms and relation terms of the ETL based ontology.

The knowledge graph may be a graph. A graph may refer to a property graph where data values are stored as properties on nodes and edges. Property graphs may be managed and processed by a graph database management system or other database systems which provide a wrapper layer converting the property graph to, for example, relational tables for storage and convert relational tables back to property graphs when read or queried. The graph may, for example, be a directed graph. The graph may be a collection of nodes (also called as vertices) and edges. The edge of the graph connects any two nodes of the graph. The edge may be represented by an ordered pair (v1, v2) of nodes and that can be traversed from node v1 toward node v2. A node of the graph may represent an entity. The entity may refer to a dataset, user etc. The entity (and the corresponding node) may have one or more entity attributes or properties which may be assigned values. For example, the entity attributes of the user may comprise a user ID, location of the user, etc. The attribute values that represent the node are values of the entity attributes of the entity represented by the node. The edge may be assigned one or more edge attribute values indicative of at least a relationship between the two nodes connected to the edge. The attribute values that represent the edge are values of the edge attributes. The relationship may, for example, comprise an inheritance (e.g. parent and child) relationship and/or associative relationship in accordance with a certain hierarchy. For example, the inheritance relationship between nodes v1 and v2 may be referred to as an "is-a relationship" between v1 and v2 e.g. "v2 is-a parent of v1". The associative relationship between nodes v1 and v2 may be referred to as a "has-a relationship" between v1 and v2 e.g. "v2 has a has-a relationship with v1" means that v1 is part of, is a composition of, or is associated with v2.

The term "ETL workflow" may refer to a set of operations that a system may perform for purposes of executing an ETL task. The set of operations may comprise sequential and/or parallel operations.

The term "dataset" as used herein refers to a collection of one or more data records. For example, the dataset may be provided in the form of a collection of related records contained in a file e.g. the dataset may be a file containing records of all students in class. The dataset may, for example, be one or more tables. The one or more tables may be tables of a database or a file of a Hadoop file system, etc. In another example, the dataset may comprise one or more documents such as an HTML page or other document types.

According to one embodiment, the determining of the source dataset comprises performing a natural language processing of the data analysis request and using the processed data analysis request for the determining of the source dataset. The purpose of this embodiment may be to make the ETL execution more user-friendly without relying on specific expertise. This may increase the availability of the data as the number of users that can execute ETL tasks may increase. This may particularly be advantageous for a cloud environment where availability of data centers may increase using the present subject matter.

According to one embodiment, the method further comprises incorporating the built ETL workflow into the knowledge graph as a property of the source dataset, as a property of a user being a requester of the data analysis request, as an entity related to the user, or as an entity related to the source dataset.

This embodiment may save processing resources that would otherwise be required to build the ETL workflows which are already stored in the knowledge graph.

According to one embodiment, the method further comprises repeating the method for further received data analysis requests. A set of ETL workflows of the knowledge graph that share one or more steps may be identified. The one or more steps may be executed and the set of ETL workflows may be adapted such that they use a result of the execution of the one or more steps without executing the one or more steps.

An advantage of this embodiment may be that it may identify the same or similar data built by multiple workflows and move it upstream, so that the same data doesn't get duplicated (storage optimization) and doesn't get built multiple times (CPU optimization). For example, if multiple users join the same tables in their workflows, the system may pre-join them and then share across these workflows. Thus, in this example, the one or more steps refer to the joining of the same tables.

This embodiment may enable the identification of data processing patterns and provide recommendations to users for a data definition stage. For instance, some data cleansing might be applied by users to certain columns in order to join with other tables. In such a case when new users will derive the corresponding tables, the system may provide suggestions of how the SQL statement can be modified to follow the common patterns, along with rationale for the suggestions. In this example, the one or more steps refer to the application of the cleansing, e.g. the cleansing may be applied once for the source dataset that is commonly used by the set of ETL workflows.

Another example of shared steps may be determined based on recommendations on how different data entities are usually joined: for instance, hardware contracts can be joined with company's revenue data using contract delivery date and selling country columns.

According to one embodiment, the method further comprises repeating the method for further received data analysis requests, wherein the building of the ETL workflow is performed using ETL workflows of the knowledge graph. For example, the building of the ETL workflow comprises selecting one ETL workflow of the knowledge graph, wherein the built ETL workflow is the selected ETL workflow.

According to one embodiment, the knowledge graph is further indicative of data access rules associated with users and datasets. The building of the ETL workflow comprises identifying using the knowledge graph data access rules that apply to a user being a requester of the data analysis request and/or to the source dataset, and including in the ETL workflow conditions for processing the source dataset in accordance with the identified data access rules.

This embodiment may embed governance rules and policies into the ETL workflows and may thus guarantees their compliance. This embodiment may thus provide secure access to data.

According to one embodiment, the data access rules comprise governance policies and/or user access rights.

According to one embodiment, the identified data access rules indicate at least one of: which part of the source dataset may be accessed from a location of the user, which part of the source dataset may be copied to a location of a target system, the target system being indicated in the data lineage, whether the user may write data to the target system, or whether the user may submit workloads.

According to one embodiment, the building of the ETL workflow comprises: defining a target dataset in accordance with the data lineage. The target dataset has immediate dependencies with the source dataset. The method further comprises determining a refresh rate of the source dataset, and based on the determined refresh rate, refreshing the source dataset such that the refreshed source dataset is processed in accordance with the ETL workflow, wherein the refreshing of the source dataset uses all datasets dependent on the source dataset. The refreshing may or may not be included as part of the ETL workflow. For example, the refreshing of the source dataset may be performed according to a desired refresh rate if the refresh rate is incompatible with the desired refresh rate. In one example, if the determined refresh rate is smaller than the desired refresh rate, the refreshing of the source dataset may be performed according to the desired refresh rate. In one example, the desired refresh rate may require a refresh of the source dataset every Tuesday of the week, while the determined refresh rate requires the refreshing every Monday of the week; although the two refresh rates have the same frequency, the two refresh rates are incompatible as they have different phases. The desired refresh rate may, for example, be higher than or equal to the refresh rate of the target dataset e.g. if the refresh rate of the target dataset is one time per month, the desired refresh rate may be one time per week, one time per day, etc. The determining of the refresh rate of the source dataset further comprises prompting a user to provide an input indicating whether the source dataset is to be refreshed or not to be refreshed based on the refresh rate, wherein the refreshing of the source dataset is performed based on the input. In another example, the determining of the refresh rate of the source dataset further comprises comparing by the computer system the refresh rate with a predefined refresh rate threshold. The predefined refresh rate threshold may, for example, be the desired refresh rate defined by a user.

The refresh rate of a table defines the frequency with which the table is updated. The refresh rate may be a part of dataset definition. For example, the dataset may automatically be refreshed according to its associated refresh rate. Datasets may be refreshed periodically (scheduled refresh) or manually on demand (one-shot refresh). The user may define (e.g. in the data analysis request) a desired refresh rate of the target dataset which conflicts with refresh rates of the immediate dependencies. In this case, the computer system may either change the latter (if the owner of the immediate dependencies allows) or create additional set of replicas of the immediate dependencies with the desired refresh rate. When a user defines a derivative for datasets with scheduled refresh, the computer system may recommend refresh schedule for the target dataset, based on the schedules for immediate dependencies. For example, if the refresh rate of the source dataset is one week, which is longer than a desired refresh rate e.g. one day, then the source dataset may need to be refreshed in accordance with the desired refresh rate before being used by the ETL workflow.

According to one embodiment, the method further comprises creating an ETL workflow metadata. The ETL workflow metadata comprises execution metadata indicative of the execution status of the ETL workflow and dataset metadata indicative of the execution status of each subset of the source dataset. The ETL workflow metadata may be provided in association with the ETL workflow.

According to one embodiment, the method further comprises: detecting an execution failure of the ETL workflow using the execution metadata, wherein one or more subsets of the source dataset are processed without failure before the detected execution failure occurred, and performing a partial re-execution of the ETL workflow for processing non-processed subsets of the source dataset. This embodiment may enable rerunning failed ETL workflows from their failure points. This may save processing resources that would otherwise be required to re-run the whole failed ETL workflows.

According to one embodiment, the re-execution of the ETL workflow is performed if the source dataset is not refreshed. This embodiment may prevent from transformation of conflicting data and may thus increase the reliability of data produced in accordance with the present subject matter.

According to one embodiment, the knowledge graph is generated using log data of ETL jobs of multiple ETL systems, wherein the execution of the ETL workflow is performed on an ETL system which is part of or not part of the ETL systems.

According to one embodiment, the method is automatically performed. For example, the ETL workflow may automatically be built and automatically be executed upon receiving the data analysis request.

FIG. 1A depicts an exemplary computer system 100. The computer system 100 may, for example, be configured to perform master data management and/or data warehousing. The computer system 100 comprises a data integration system 101 and one or more client systems 105 or data sources. The client system 105 may comprise a computer system. The client systems 105 may communicate with the data integration system 101 via a network connection which comprises, for example, a wireless local area network (WLAN) connection, WAN (Wide Area Network) connection, LAN (Local Area Network) connection the internet or a combination thereof. The data integration system 101 may control access (read and write accesses etc.) to a central repository 103.

Data records stored in the central repository 103 may have values of a set of attributes 109A-P such as a company name attribute. Although the present example is described in terms of few attributes, more or less attributes may be used.

Data records stored in the central repository 103 may be received from the client systems 105 and processed by the data integration system 101 before being stored in the central repository 103. The received records may or may not have the same set of attributes 109A-P. For example, a data record received from client system 105 by the data integration system 101 may not have all values of the set of attributes 109A-P e.g. the data record may have values of a subset of attributes of the set of attributes 109A-P and may not have values for the remaining attributes. In other terms, the records provided by the client systems 105 may have different completeness. The completeness is the ratio of number of attributes of a data record comprising data values to a total number of attributes in the set of attributes 109A-P. In addition, the received records from the client systems 105 may have a structure different from the structure of the stored records of the central repository 103. For example, a client system 105 may be configured to provide records in XML format, JSON format or other formats that enable to associate attributes and corresponding attribute values.

In another example, data integration system 101 may import data records of the central repository 103 from a client system 105 using one or more ETL batch processes or via HyperText Transport Protocol ("HTTP") communication or via other types of data exchange.

The data integration system 101 may be configured to receive requests from a user 110 to perform a certain analysis. Upon receiving the request, the data integration system 101 may define an ETL workflow corresponding to the request and/or execute the ETL workflow. The data integration system 101 may define the ETL workflow itself by building it in accordance with the present subject matter or by requesting another system to build the ETL workflow in accordance with the present subject matter and to receive that built ETL workflow. For example, the execution of the ETL workflow may cause the data integration system 101 to receive or retrieve records from one or more client systems 105 as described herein. The data integration system 101 may process received records using one or more algorithms such as an algorithm 120 implementing at least part of the present method. For example, the data integration system 101 may process a data record received from the client systems 105 using the algorithm 120 in accordance with the ETL workflow. The ETL workflow may be defined or built e.g. by the algorithm 120 using a knowledge graph 121. The knowledge graph 121 may, for example, represent an ETL based ontology as described with reference to FIG. 1B.

Figure 1B:
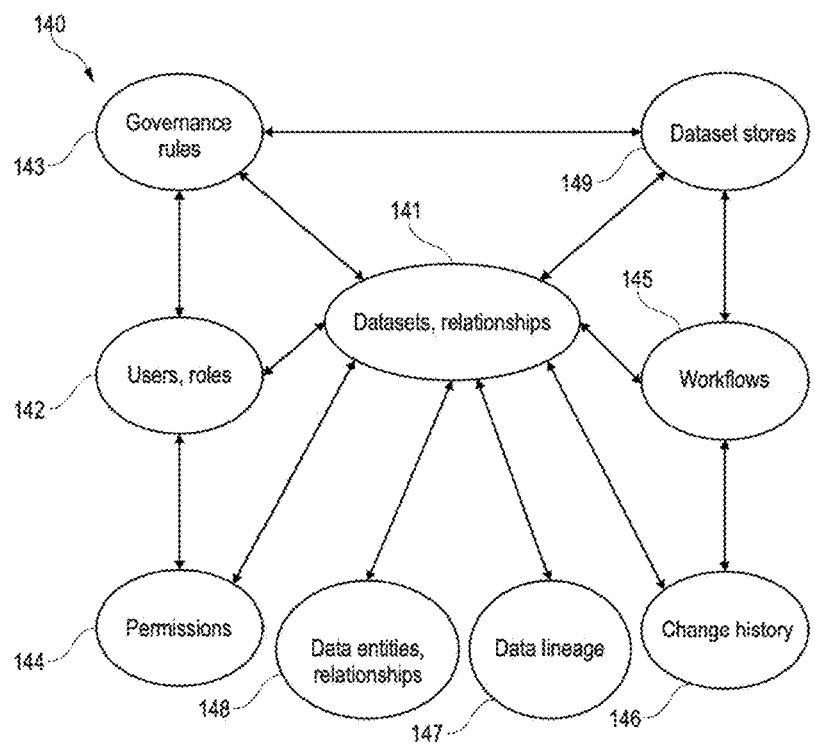
FIG. 1B depicts an ETL based ontology, in accordance with the exemplary embodiments.

FIG. 1B illustrates an example of an ETL based ontology 140. The ETL based ontology 140 includes concepts and roles. The concepts and roles are examples of the terminological aspects of the ETL based ontology 140. The concepts and roles can be expressed in various ways. FIG. 1B illustrates the concepts and roles in a graphical form.

The ETL based ontology 140 may contain two kinds of terms: a concept term and a relation term. Each node in the ETL based ontology 140 identifies a concept term. The ETL based ontology 140 may include, for example, concept terms 141, 142, 143, 144, 145, 146, 147, 148 and 149. The concept term 141 includes a dataset concept and the terms 142 to 149 include, respectively, user, governance rules, permissions, workflows, change history, data lineage, data entities, and dataset stores concepts. In this example, the concept terms 142 to 147 may each be a subclass of the concept term 141. The concept term 141 may be a superclass of the concept terms 142 to 147.

Each of the concept terms 141 to 149 may be associated with each other via one or more relation terms. The relation terms may be properties that connect two concept terms. The ETL based ontology 140 may further comprise properties or attributes that describe the concept terms and the relation terms. For example, a table property of the dataset concept may comprise a type of analysis that was previously performed on the dataset, a SQL statement indicating how the dataset is obtained from other datasets, a location of the dataset, etc. A user property of the user concept may, for example, comprise a user ID of the user, a location of the user, etc. A data lineage property of the data lineage concept may indicate data operations and the target system where the result of the data operations is stored.

The ETL based ontology 140 may be used to create the knowledge graph 121. For that, data about ETL tasks may be collected. With this collected data, as well as the ETL based ontology 140, specific instances of the terms of the ETL based ontology 140 may be created and values of the properties of the terms may be determined, resulting in the knowledge graph 121. The knowledge graph may thus represent the ETL based ontology 140. The knowledge graph comprises nodes representing entities and edges representing relationships between the entities. The entities are instances of concepts of the ETL based ontology.

Figure 2:
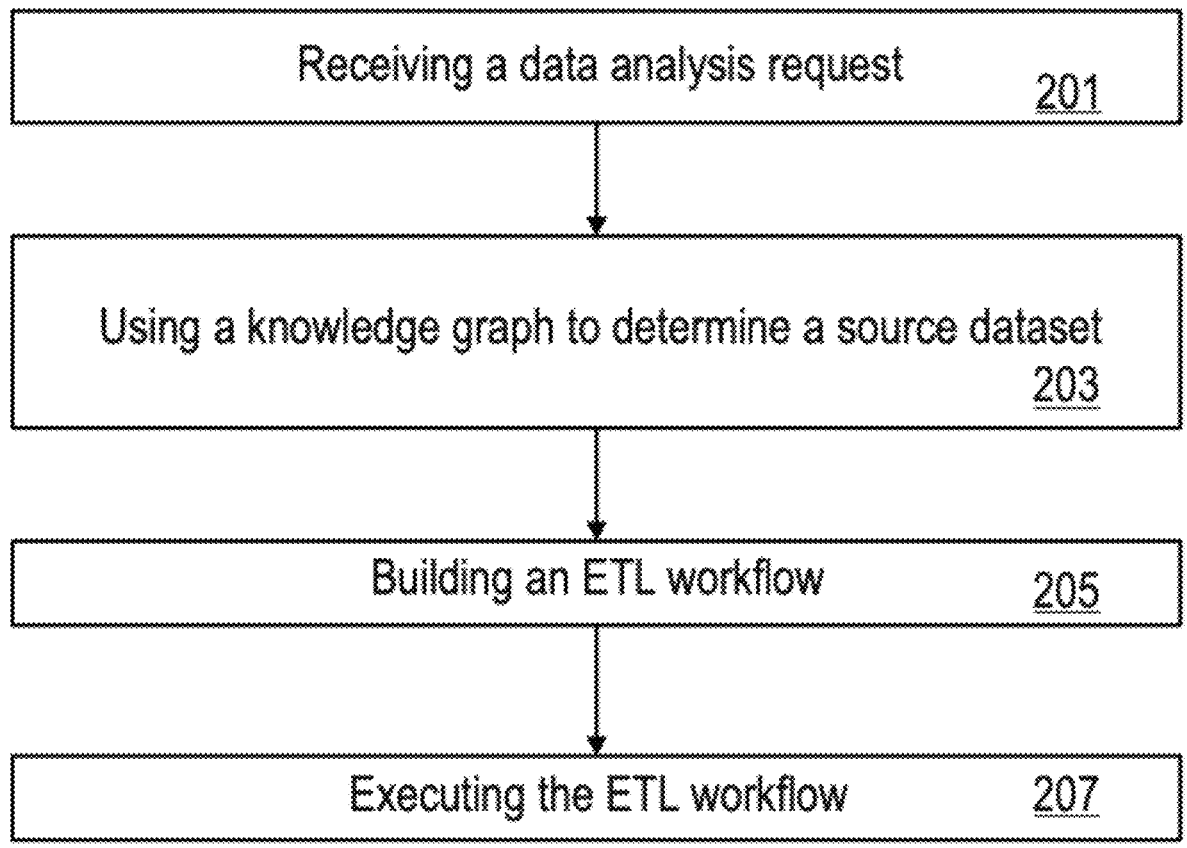
FIG. 2 is a flowchart of a method for automated workflow generation, in accordance with the exemplary embodiments.

FIG. 2 is a flowchart of a method for performing an ETL task in accordance with an example of the present subject matter. For the purpose of explanation, the method described in FIG. 2 may be implemented in the system illustrated in FIG. 1A, but is not limited to this implementation. The method of FIG. 2 may, for example, be performed by the data integration system 101.

A data analysis request may be received in step 201. The data analysis request is a request. The data analysis request may, for example, be a request to prepare data for a subsequent analysis of the prepared data. In another example, the data analysis request may indicate a data analysis, wherein the data analysis may require source data to be prepared before being analyzed. The data analysis request may be received from the user 110. The term "user" may refer to an entity e.g., an individual, a computer, or an application executing on a computer that issues data analysis requests. The data analysis request may be received via an ETL interface of the data integration system 101.

In one example, the data analysis request may be a SQL statement. The SQL statement may specify one or more tables. This may particularly be advantageous for expert users. In another example, the data analysis request may comprise natural language data. A natural language processing of the data analysis request may thus be performed in step 201 resulting in a processed data analysis request. This may provide a user-friendly interface to normal users to perform ETL tasks without the need of expertise.

The received or processed data analysis request may be analyzed in order to determine or derive values of terms and/or properties of the ETL based ontology 140. In particular, properties associated with datasets in the ETL based ontology may be derived from the data analysis request. For example, based on the processed data analysis request, a type of analysis and one or more data table names may be determined. The derived values of terms and/or properties may advantageously be used to perform an ETL task.

The configuration of the ETL task may start from defining which tables are going to be used in the ETL task. For that, the knowledge graph 121 may be used for determining or identifying a source dataset based on the received data analysis request in step 203. The properties derived from the data analysis request may be used to identify one or more nodes that represent the source dataset in the knowledge graph 121. For example, the type of analysis or table names may be used to identify the source dataset that is associated with that type of analysis or the table names in the knowledge graph.

An ETL workflow may be built or determined in step 205. The ETL workflow may be used for processing the source dataset in accordance with a data lineage associated with the source dataset in the knowledge graph. The ETL workflow may comprise steps of data operations that may need to be performed in order to complete an ETL task. For example, before the ETL task starts, tables may need to be created in a target relational database. Those will be the destinations for records produced by the ETL workflow. For that, the data lineage associated with the source dataset in the knowledge graph may indicate the target relational database. The step of creating and managing those target tables may be included in the ETL workflow. The data lineage may further be used to determine transformation operations, such as retrieving input data, reading inputs row-by-row, and mapping values (transformed or not) to the output columns. During transformation, data may be read from the source dataset, and may be mapped to multiple output tables, depending on the transformation logic. The transformation operations may be included in the ETL workflow. In addition, data access to the source dataset and the target database may be constrained by one or more access rules. For that, the knowledge graph may be used to identify access rules to the source dataset and/or target database. Those access rules may be implemented in the ETL workflow.

Hence, by simply sending a request of an analysis, the user may receive an ETL workflow that enables the user to prepare the data in order to perform the analysis. In one example, the ETL workflow may further include steps for performing the analysis at the target database. This may enable a fully automatic method for executing the analysis.

The ETL workflow may be executed in step 207. Furthermore, the ETL workflow may be inserted in the knowledge graph in step 207 for a further usage of the knowledge graph. The ETL workflow may be associated with the source dataset concept and/or with the user concept in the knowledge graph. In one example, step 207 may automatically be repeated if a change occurs that may affect the source dataset determined in step 203. For example, step 207 may automatically be repeated if at least part of (e.g. all of) the source dataset and datasets on which it may depend changes.

In another example, steps 203-207 may automatically be performed upon receiving the data analysis request. Steps 203-207 may automatically be repeated upon receiving further data analysis requests. In each iteration, the step of building the ETL workflow may comprise determining whether an existing ETL workflow is associated with the source dataset or with the user 110 in the knowledge graph, and if so, using that existing workflow as the built workflow, otherwise building the ETL workflow as described with respect to step 205.

Figure 3:
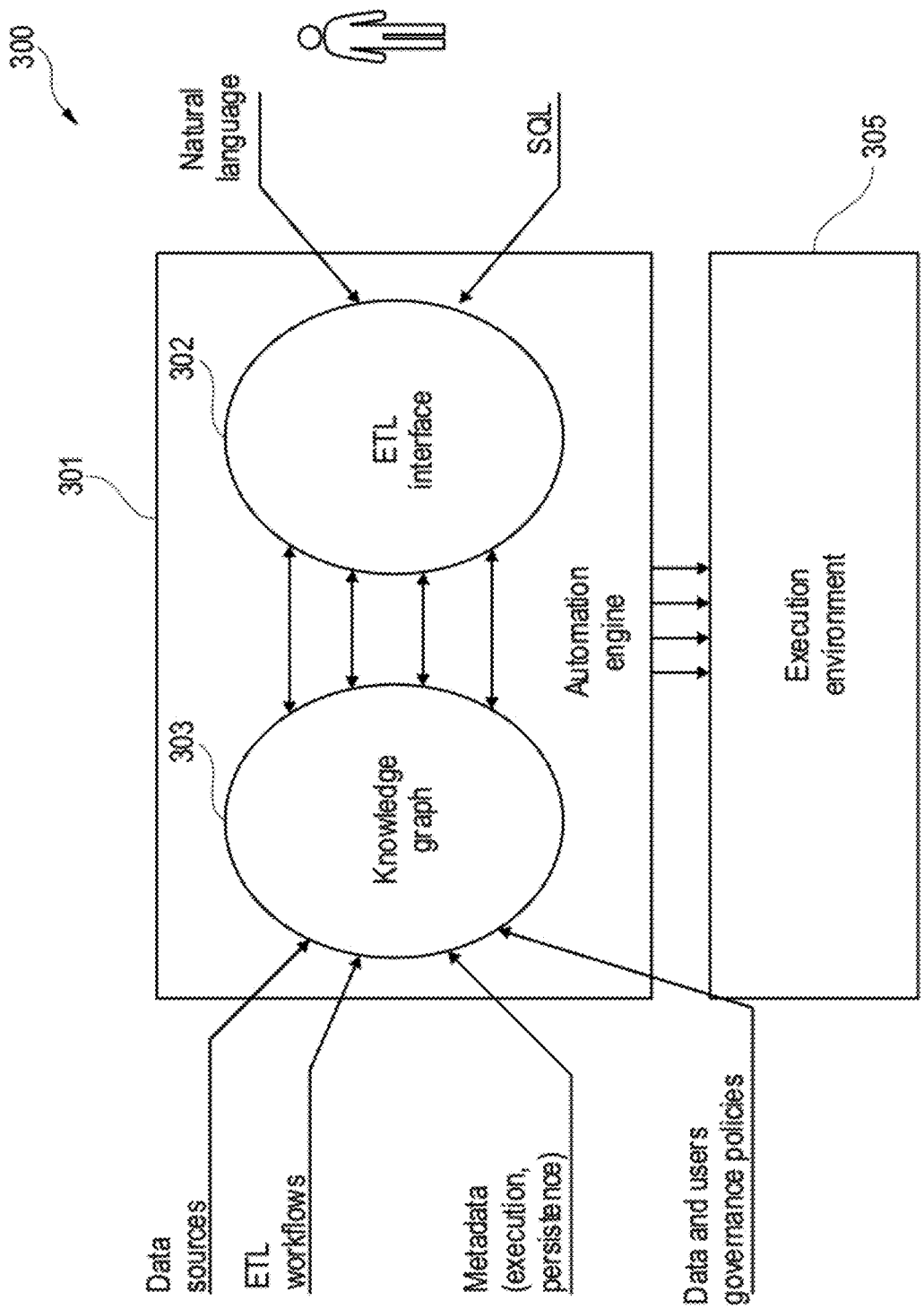
FIG. 3 is a block diagram of a computer system, in accordance with the exemplary embodiments.

FIG. 3 is a block diagram of a computer system 300 in accordance with an example of the present subject matter. The computer system 300 comprises an automation engine 301 and an execution environment 305. The automation engine 301 comprises an ETL interface 302 and a knowledge graph 303. The ETL interface 302 is configured to receive data analysis requests in natural language or as SQL statements. The automation engine 301 may, for example, be configured to perform the method steps 201 through 205 of FIG. 2 using the knowledge graph 303. The resulting ETL workflow may be executed in the execution environment 305.

Figure 4A:
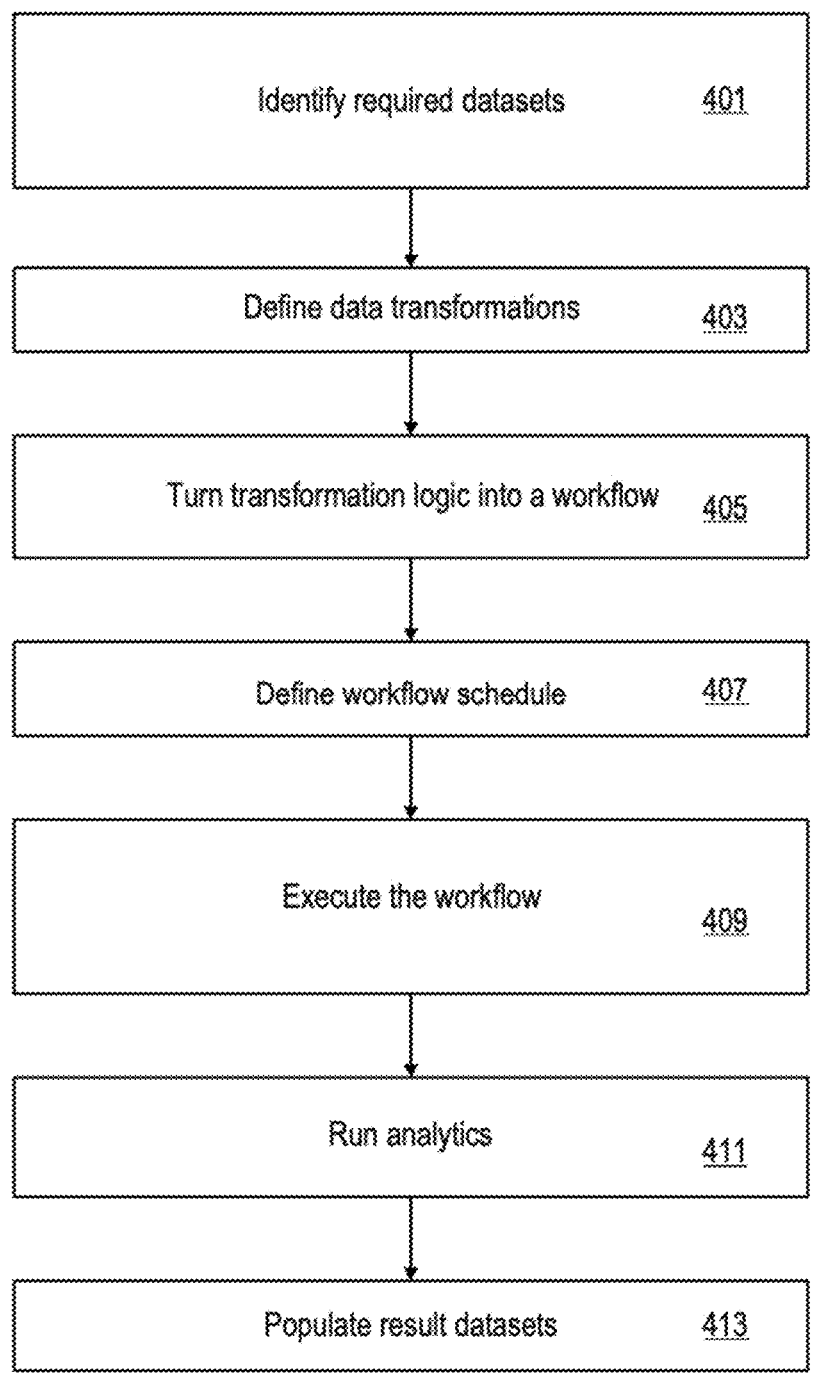
FIG. 4A is a flowchart of a method of performing a data analysis, in accordance with the exemplary embodiments.

FIG. 4A is a flowchart of a method for performing an ETL task in accordance with an example of the present subject matter.

Figure 4B:
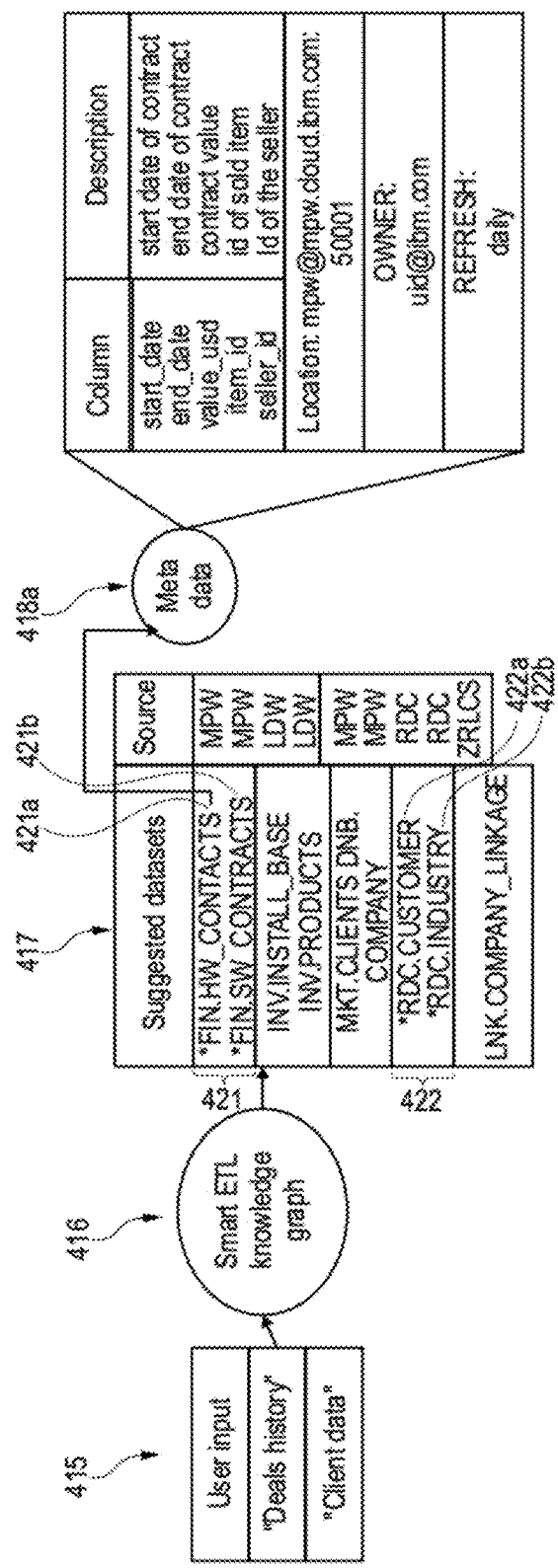
FIG. 4B is a block diagram illustrating a method for identifying source datasets, in accordance with the exemplary embodiments.

In step 401, source datasets may be identified. The source datasets may be used to perform an analysis. For example, the source datasets may be identified in response to receiving a data analysis request. The data analysis request may, for example, be received from a data scientist. The data analysis request may require a production of offering recommendations, e.g. determine what client can buy what products with assessment of probability and potential size of deals. As depicted in FIG. 4B, the data analysis request 415 may comprise natural language input data such as the keywords "Deal history" and "Client data." The data analysis request 415 may be parsed and processed in order to evaluate one or more properties (named request properties) of the ETL based ontology. The request properties may, for example, comprise an indication of the user who submitted the data analysis request 415. The request properties may further comprise a role of the user. The request properties may further comprise the type of analysis that is requested, etc.

As shown in FIG. 4B, the data analysis request 415 may be used to identify candidate source datasets 417 using a knowledge graph 416. The knowledge graph 416 may, for example, represent the ETL based ontology as described with reference to FIG. 1B. Each of the candidate source datasets 417 is associated with a data source where it is located. For example, part of the evaluated request properties such as the analysis type may be used to identify the candidate source datasets 417. The search may further be refined by using further properties of the request properties. For example, based on the user role, some of the candidate source datasets 417 may be excluded. Since the user role relates to a data scientist, the source datasets 421 and 422 may be selected among the candidate source datasets 417. In this example, each of the source datasets 421 and 422 comprises two tables 421a-b and 422a-b respectively. As with other tables of the knowledge graph 416, each of the identified source data tables 421 and 422 may be associated with properties or metadata (named table properties). FIG. 4B shows, for simplification purpose, only the table properties 418a of the source table 421a. The table properties 418a may, for example, comprise the start date of contract, the end date of contract, the contract value, the ID of a sold item, the ID of the seller, the location of the source table 421a, the owner of the source table 421a, and the refresh rate of the source table 421a. Each of the identified data tables 421a-b and 422a-b may be entities of the knowledge graph 416. The knowledge graph 416 may, for example, be built using ETL jobs executed by different users such as data scientists. That is, the instances of terms of the ETL based ontology may be defined using data indicative of the ETL jobs of the data scientists and other types of users.

Figure 4C:
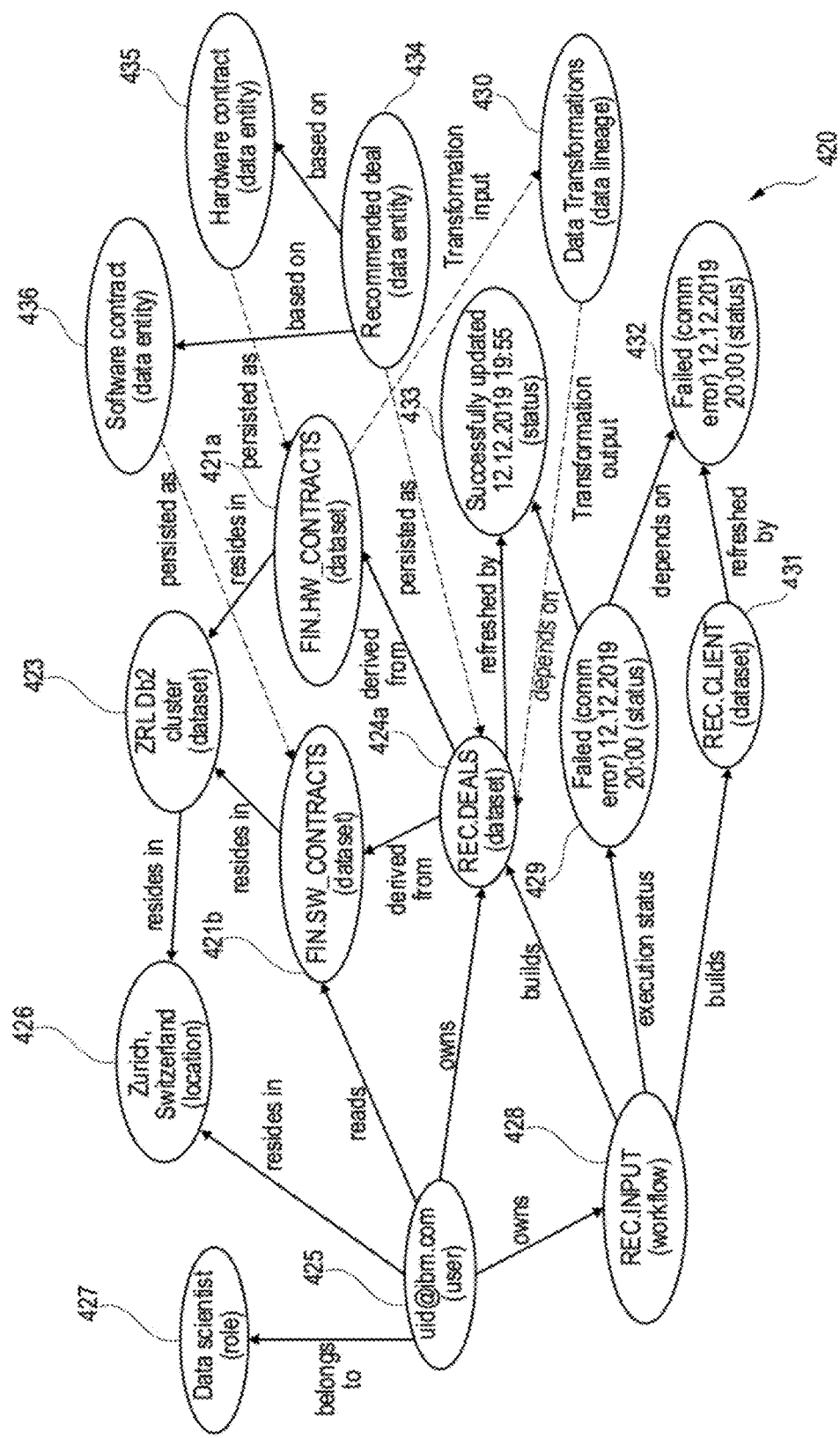
FIG. 4C is a block diagram of a knowledge graph, in accordance with the exemplary embodiments.

FIG. 4C depicts a subgraph 420 of the knowledge graph 416. The subgraph 420 involves users and datasets that match the "deals history" keyword of the data analysis request 415. The identified source tables 421a and 421b may be nodes of the subgraph 420 of the knowledge graph 416 as shown in FIG. 4C. The source tables 421a and 421b are linked to a data source 423 where they reside and from which their location 426 may be retrieved. The data source tables 421a and 421b are linked to a target table 424a that has been produced out of the source tables 421a and 421b. Each of the tables 421a, 421b and 424a is further linked with other entities of the subgraph 420 further specifying the table. For example, a user 425 that owns the target table 424a and can read the source tables 421a and 421b linked to the tables. The user 425 may further be linked to other entities further specifying features of the user such as the location 426 of the user and the role 427 of the user. FIG. 4C shows further example entities 423 through 436 that are related either directly or indirectly to the source tables 421a and 421b. For example, status of execution and update of datasets may be provided by nodes 429, 432 and 433. Sample data entities 434 through 436 indicative of the target dataset and source dataset respectively may be provided.

The source tables 421a and 421b are the ones identified in step 401 in the subgraph 420 because they are linked to a user 425 that has a similar role as the user who sent the data analysis request and performed analysis in line with the requested data analysis. The source tables 422a and 422b may be identified in step 401 similarly using the knowledge graph 416.

Figure 4D:
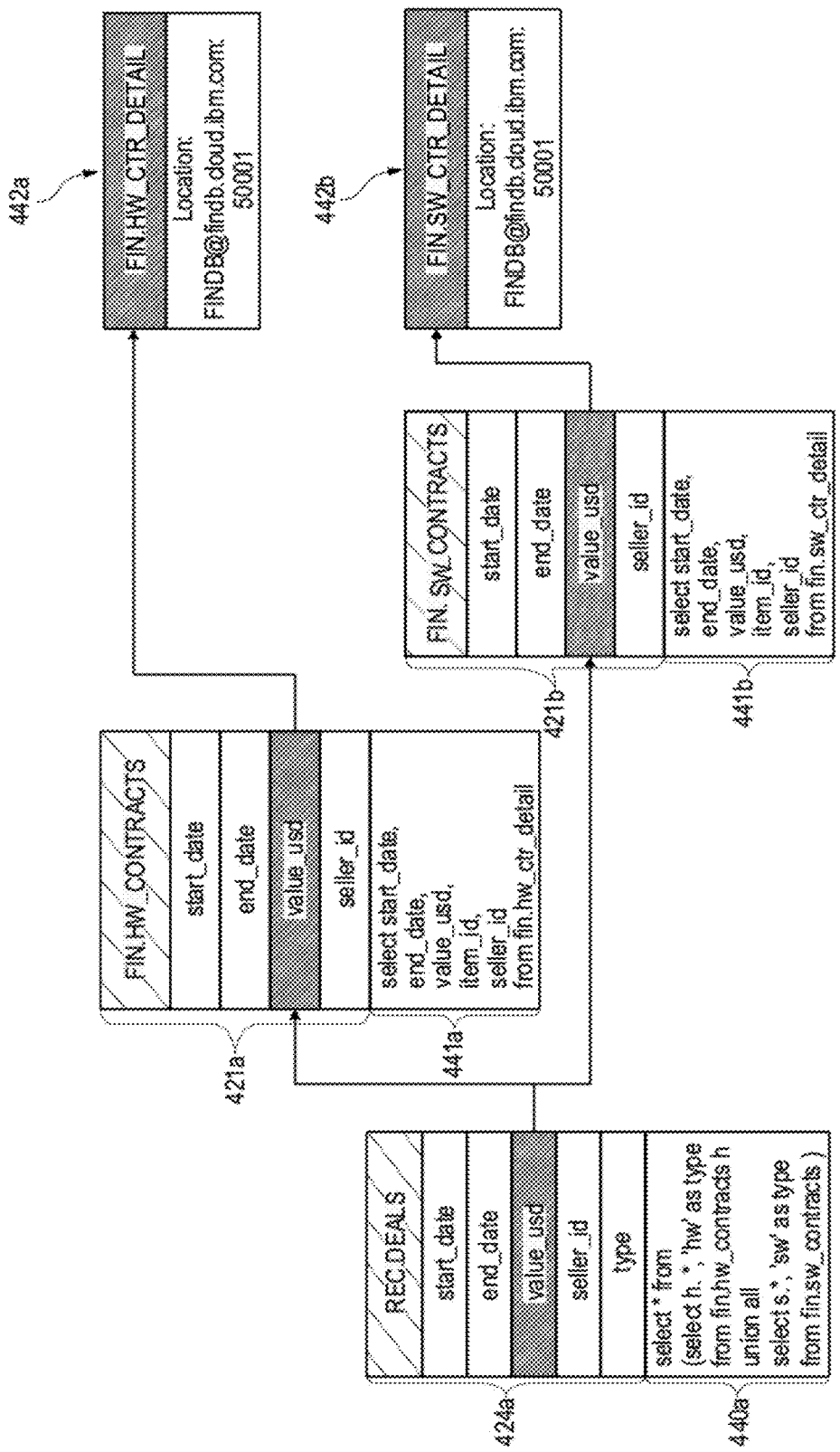
FIG. 4D depicts a data lineage, in accordance with the exemplary embodiments.

After identifying the source datasets 421 and 422, the method proceeds to step 403, where data transformations may be determined. The data transformations may be determined such that they may be applied on the source tables 421a-b and 422a-b in accordance with the data analysis request. The data transformations may be determined using the data lineages, e.g. 430 associated with the source tables 421*a-b* and 422*a-b*. FIG. 4D shows an example data lineage involving the target table 424*a* and corresponding source tables 421*a-b*. The data lineage indicates the relation between the tables based on one of the table properties of the tables, wherein said table property may be a value_usd property.

Figure 4E:
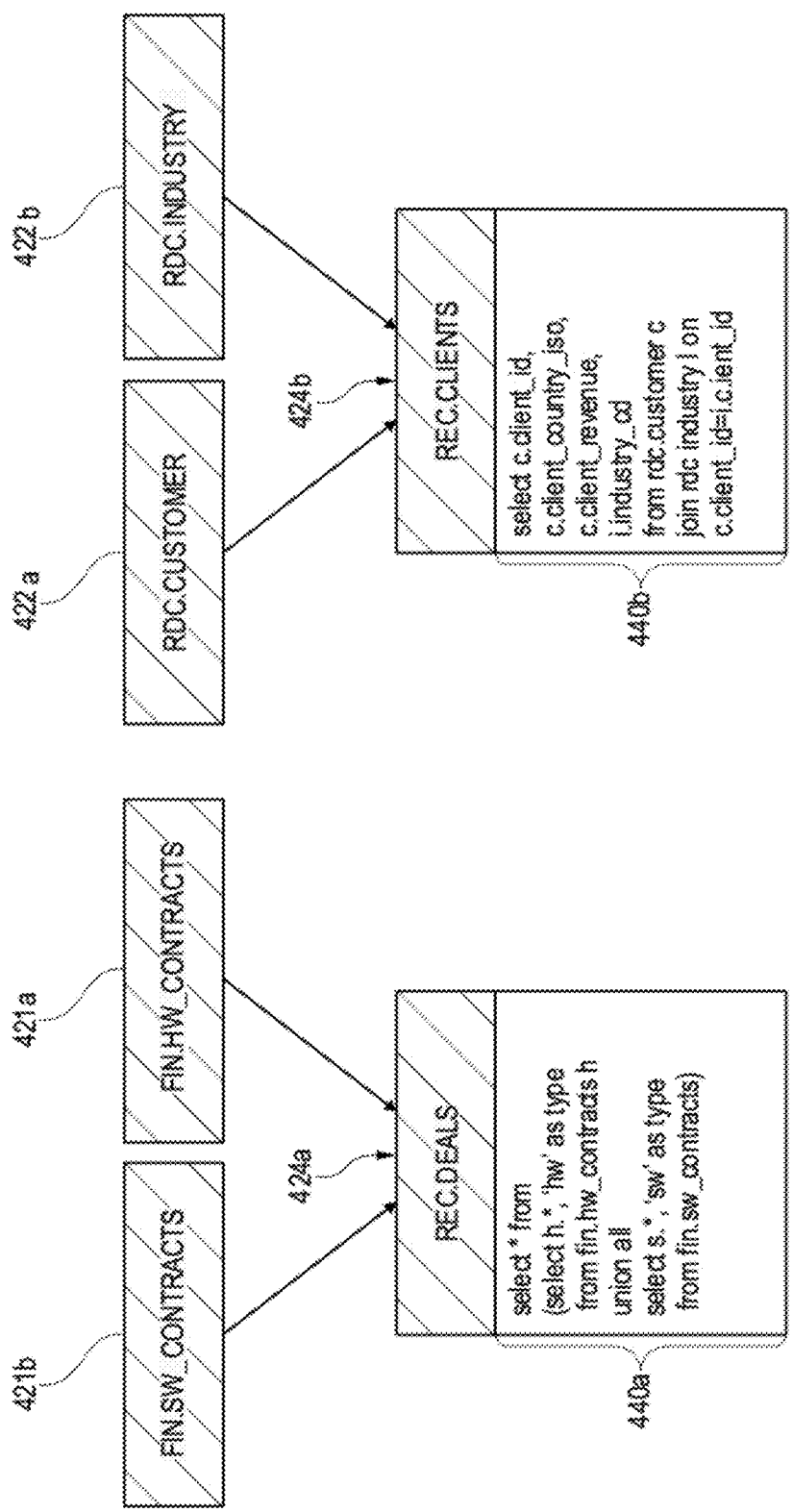
FIG. 4E is a block diagram illustrating a method for determining data transformations, in accordance with the exemplary embodiments.
Figure 5:
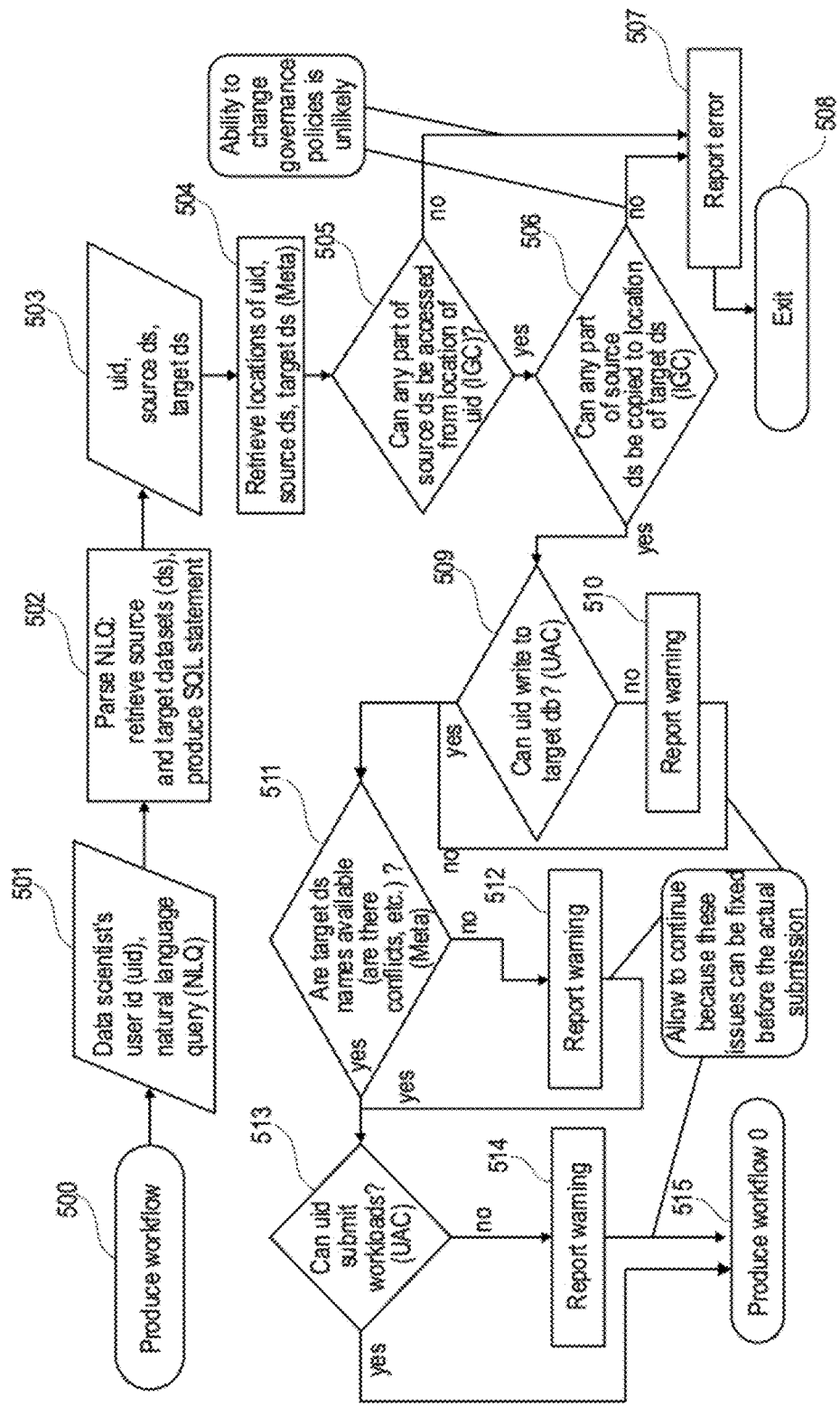
FIG. 5 is a flowchart of a method for implementing data access rules, in accordance with the exemplary embodiments.
Figure 6:
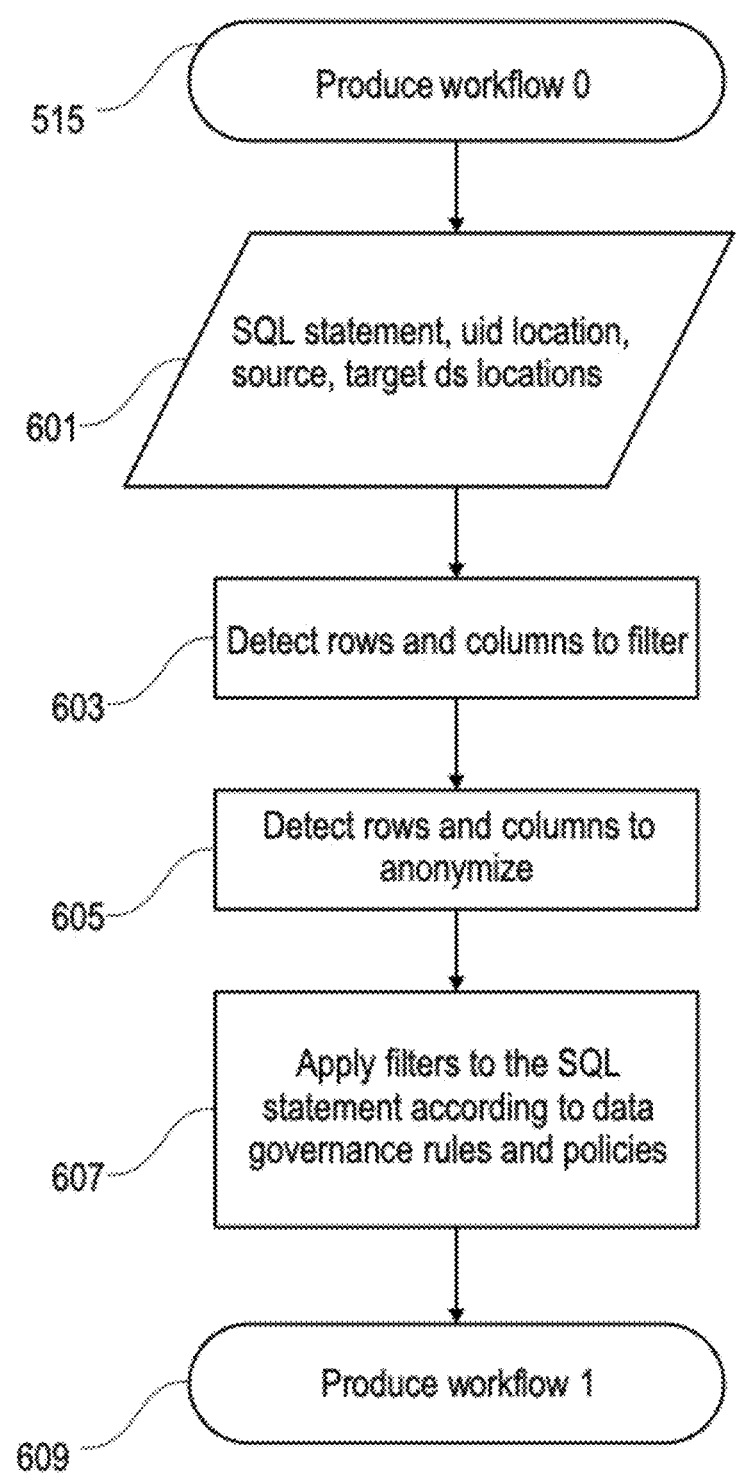
FIG. 6 is a flowchart of a method for determining data transformations, in accordance with the exemplary embodiments.

As shown in FIG. 4D, each of the source and target tables 421*a-b* and 424*a* is associated with an SQL statement. The source table 421*a* is associated with the SQL statement 441*a* indicating that the values of the table properties of the source table 421*a* are obtained from the table 442*a*. The source table 421*b* is associated with the SQL statement 441*b* indicating that the values of the table properties of the source table 421*b* are obtained from the table 442*b*. The target table 424*a* is associated with the SQL statement 440*a* indicating the transformation applied to the source tables 421*a-b* in order to obtain the target table 424*a*. The data transformations may be determined based on the SQL statements associated with the tables 421*a-b* and 424*a*. In particular, the determined data transformations 440*a* and 440*b*, as depicted in FIG. 4E, may be used to obtain the target tables 424*a* and 424*b* from the source tables 421*a-b* and 422*a-b* respectively. For example, the data transformations 440*a* and 440*b* are applied on the source tables 421*a-b* and 422*a-b* in order to obtain the target tables 424*a* and 424*b* respectively. FIG. 5 and FIG. 6 provide implementation details of step 403.

Figure 4F:
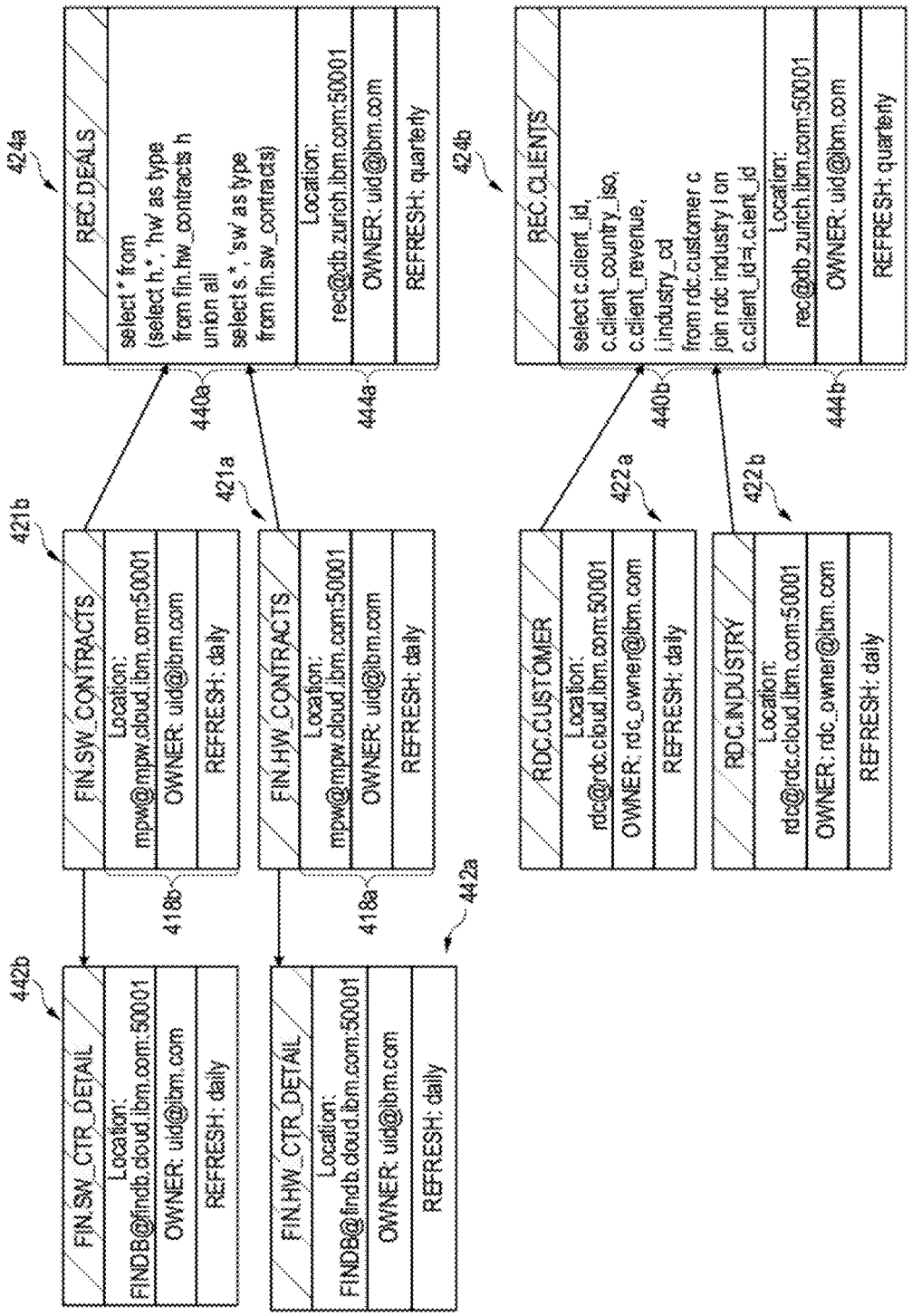
FIG. 4F is a block diagram illustrating dependencies between source datasets and target datasets, in accordance with the exemplary embodiments.
Figure 4G:
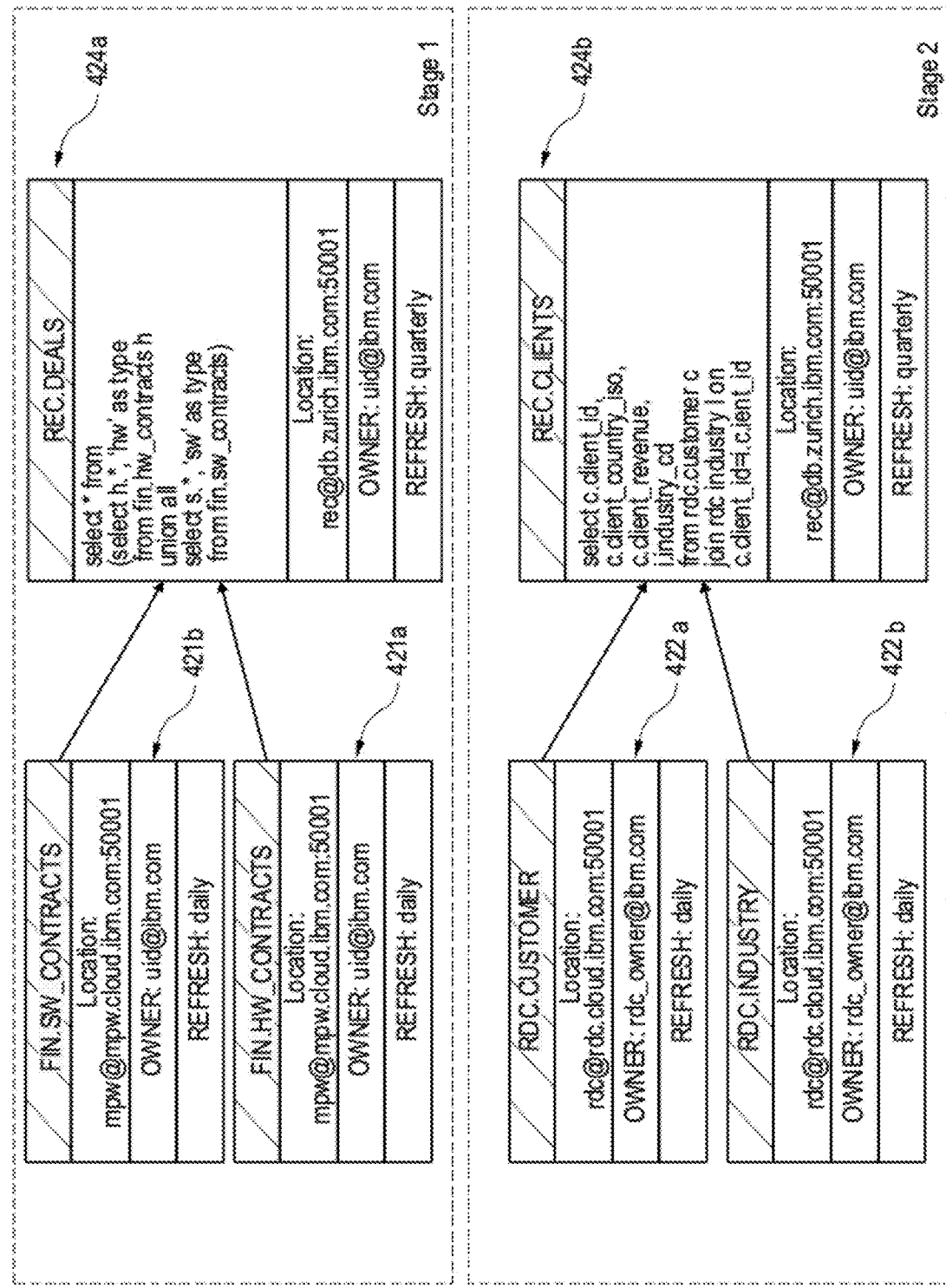
FIG. 4G is a block diagram illustrating ETL execution stages, in accordance with the exemplary embodiments.
Figure 7A:
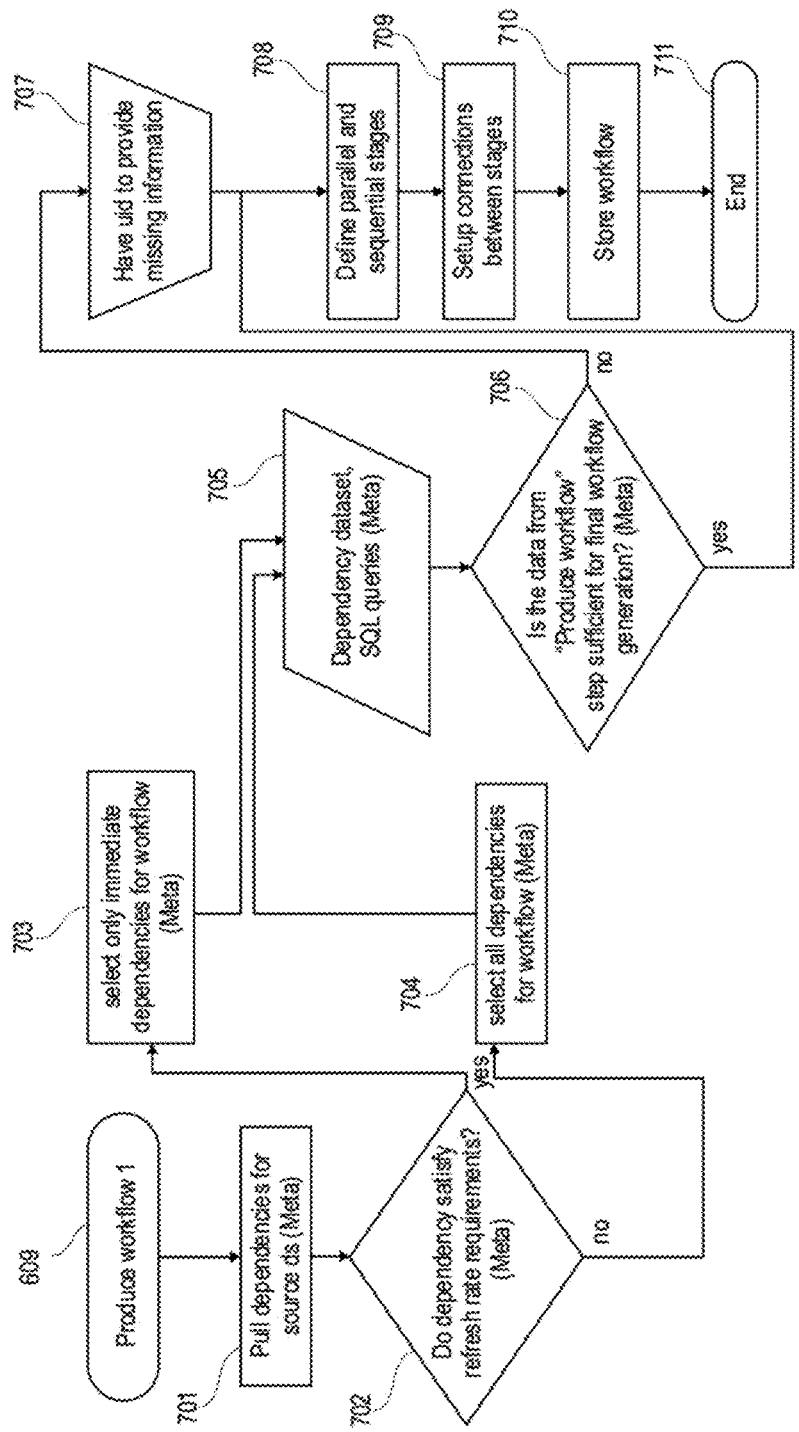
FIG. 7A is a flowchart of a method for turning the transformation logic into an ETL workflow, in accordance with the exemplary embodiments.

After determining the data transformations, the method proceeds to step 405, where the transformation logic may be turned into an ETL workflow. The determined data transformations may be included in the ETL workflow. Moreover, dependencies of the target tables 424*a* and 424*b* may be determined. As shown in FIG. 4F, the target table 424*a* has an immediate dependency with the source tables 421*a* and 421*b*, wherein the source tables 421*a-b* have dependencies with the tables 442*a-b* respectively. Similarly, the target table 424*b* has an immediate dependency with the source tables 422*a* and 422*b*, wherein the source tables 422*a-b* may have no dependencies. The dependencies may advantageously be used to enhance the ETL workflow with additional data operations or steps that enable an efficient processing of the source datasets. For example, if the refresh rate of the source tables 421*a-b* is smaller (i.e. less frequent) than a desired rate threshold, a data operation of the ETL workflow may be defined such that the source tables 421*a-b* may be refreshed in accordance with the desired rate before being transformed. The refreshing of the source tables 421*a-b* may use all dependency tables namely 442*a* and 442*b* of the source tables respectively. The dependencies may also be used to determine the way the target tables 424*a* and 424*b* may be produced. This is, for example, shown in FIG. 4G where the stages of the transformations are defined based on the dependencies of the target tables 424*a* and 424*b*. The stage may be a building block of the ETL workflow. Each stage of the stages may describe a data source, one or more data processing (or data transformation) steps, and/or a target system, and may define the processing logic that moves data from input links to output links. The stages may comprise sequential and/or parallel stages. When two stages are sequential, a second stage may not start execution before the first one is finished. Stages may also be parallel. Following the present example, two parallel stages may be defined in order to be executed, a first stage associated with the target table 424*a* and a second stage associated with the target table 424*b*. FIG. 7A provides implementation details of step 405.

After determining the ETL workflow, the method proceeds to step 407 where a workflow schedule is defined such that the ETL workflow may be executed in step 409 in accordance with the schedule. This may result in the production of the target tables 424*a* and 424*b*. The analysis may then be performed on the produced data in step 411 and results of the analysis may be populated in result datasets in step 413.

FIG. 5 is a flowchart of a method 500 for implementing data access rules in accordance with an example of the present subject matter. The method 500 may enable a production of the ETL workflow. The data access rules may be associated with the source datasets 421 and 422 in the knowledge graph 416, and may be considered when defining the data transformations of step 403.

In step 501, a natural language query may be received from a data scientist's user having a defined user ID, uid. As with step 401, in step 502, the natural language query may be parsed in order to determine source and target datasets and produce a corresponding SQL statement that may be used to perform data transformation from source datasets into the target datasets. As indicated in block 503, step 502 may result in a user uid, source datasets 421 and 422, and target datasets 424*a* and 424*b*. The locations of the user and the source and target datasets may be determined or retrieved in step 504. For example, it may be determined that the location of the source dataset 421 is the data source 423 as shown in the knowledge subgraph 420. It may be determined (step 505) whether any part of the source datasets 421-422 may be accessed from the location of the user. In the case that a part of the source datasets 421-422 may not be accessed from the location of the user, a report error may be generated in step 507 and the method may end in step 508. As indicated in FIG. 5, the ability to change governance policies is unlikely in this case. In the case that any part of the source dataset 421-422 may be accessed from the location of the user, it may be determined (step 506) whether any part of the source datasets 421-422 may be copied to the location of target dataset 424*a* and 424*b* respectively. In the case that a part of the source datasets 421-422 may not be copied to the location of target dataset 424*a*, the method proceeds to steps 507 and 508. As indicated in FIG. 5, the ability to change governance policies is unlikely in this case.

In the case that any part of the source datasets 421-422 may be copied to the location of target dataset 424*a* and 424*b* respectively, it may be determined (step 509) whether the user may write to the target database where the target datasets 424*a* and 424*b* may be. In the case that the user may not write to the target database, a report warning may be issued in step 510 and the method proceeds to step 511. In the case that the user may write to the target database, the method proceeds to step 511, where it may be determined whether the names of the target dataset 424*a* are available. In the case that the target dataset names are not available, a report warning may be issued in step 512 and the method proceeds to step 513. In the case that the target dataset names are available, the method proceeds to step 513 where it may be determined whether the user may submit workloads. In the case that the user may not submit workloads, a report warning may be issued in step 514 and the method proceeds to step 515. As indicated in FIG. 5, the report warnings allow to continue because their related issues can be fixed before the actual submission. In the case that the user may submit workloads, this may indicate that the user may execute the ETL workflow or indicate that the ETL workflow may further be defined as indicated by step 515.

The data access rules as defined in FIG. 5 may be used to define conditions (e.g. involving filters and anonymizations) that may be applied on the data transformations of the ETL workflow. For example, the steps of FIG. 5 may be included as steps of the ETL workflow as shown in FIG. 6. Step 601 may provide the SQL statement that may be used to perform data transformation, and the locations of the user and the source and target datasets. In step 603, the rows and columns of the source and/or target datasets that may be filtered may be detected. In step 605, the rows and columns of the source and/or target datasets that may be anonymized may be detected. In step 607, the filters may be applied to the SQL statement according to data governance rules and policies as described in FIG. 5. The steps of the method of FIG. 6 may be followed by the method 609 of producing a workflow as described in FIG. 7A. This may enable to adjust the SQL statement to ensure compliance with governance rules and policies. Thus, depending on the rules, the same query might return different results depending on the locations of target datasets, source datasets, and the user submitting the query. For example, European (EU) or United States (US) data can be filtered according to General Data Protection Regulation (GDPR) or Federal Law.

FIG. 7A is a flowchart of a method for turning the transformation logic into a workflow in accordance with an example of the present subject matter. The dependencies may be pulled for the source datasets 421-422 in step 701. For example, step 701 may indicate that the source tables 421a-b (cf. FIG. 4F) are immediate dependencies of the target table 424a and are dependent on the source tables 442a and 442b respectively. It may be determined (step 702) whether the dependencies satisfy refresh rate requirements. Following the example of FIG. 4F, it may be determined in step 702 whether the refresh rate of each of the source tables 421a-b, 442a-b and 422a-b satisfies the refresh rate requirement, e.g. whether the refresh rate is greater than a desired rate threshold. In the case that the dependencies satisfy refresh rate requirements, only immediate dependencies may be selected in step 703 and the method proceeds to step 705. Following the example of FIG. 4F, in the case that the dependencies satisfy refresh rate requirements, only immediate dependencies (of the target tables 424a and 424b) including the source tables 421a-b and 422a-b may be selected. In the case that the dependencies do not satisfy refresh rate requirements, all dependencies may be selected in step 704 and the method proceeds to step 705. Following the example of FIG. 4F, and in the case that the dependency includes only the source tables 421a-b and does not satisfy the refresh rate requirements, the source table 442a-b may be added to the source tables 421a-b in order to be used together for enabling the data transformation. In one example, in order to fulfil the refresh rate requirements, the refresh rate may be changed for the source datasets 421a-b and 442a-b in their location if their owner allows for that. Otherwise, a replicate dependency dataset of theses source datasets may be created and their refresh rate may be adapted to fulfil the refresh rate requirements. Thus, step 704 or 703 may result in a dependency dataset that fulfils the refresh rate requirements and corresponding SQL queries as indicated in step 705. It may be determined in step 706 whether the data is sufficient for final workflow generation. In the case that the data is not sufficient for final workflow generation, the user may be requested to provide missing data in step 707 and the method proceeds to step 708. For example, data may be sufficient if its content indicates at least a source dataset, a target dataset, and a transformation operation of the source dataset to the target dataset. In the case that the data is sufficient for final workflow generation, the method proceeds to step 708 where parallel and sequential execution stages may be defined. The stages may, for example, be defined based on the transformations defined in FIG. 4A-6. After defining the parallel and sequential stages, the method proceeds to step 709 where connections are setup between the stages. The resulting ETL workflow may be stored in step 710 and the method may end in step 711. FIG. 7B-E provide an example of operations of the stored workflow.

Figure 7B:
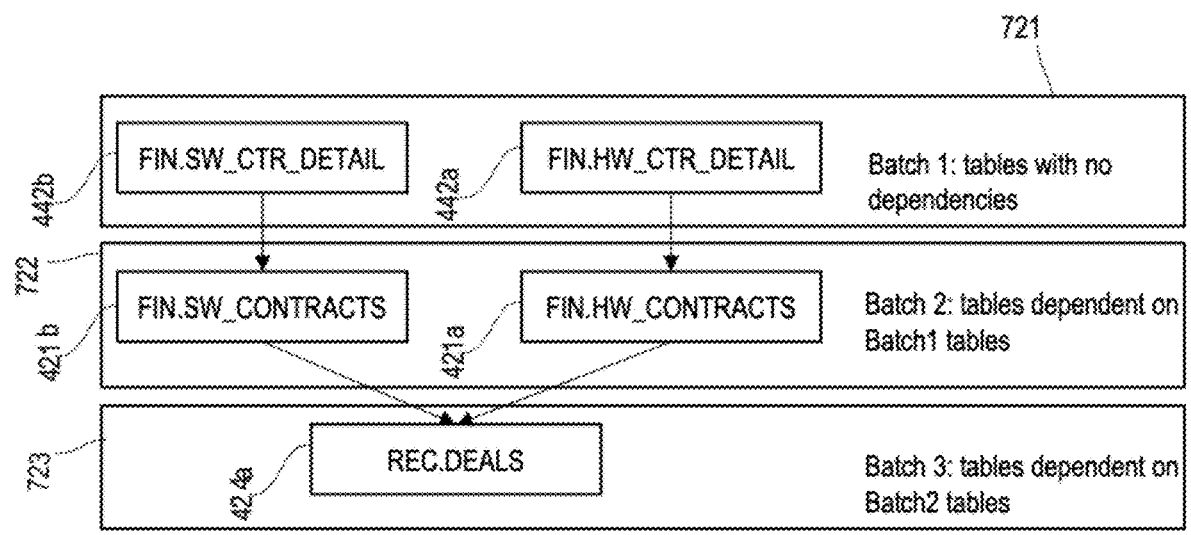
FIG. 7B is a block diagram illustrating a method for determining workflow execution stages, in accordance with the exemplary embodiments.
Figure 7C:
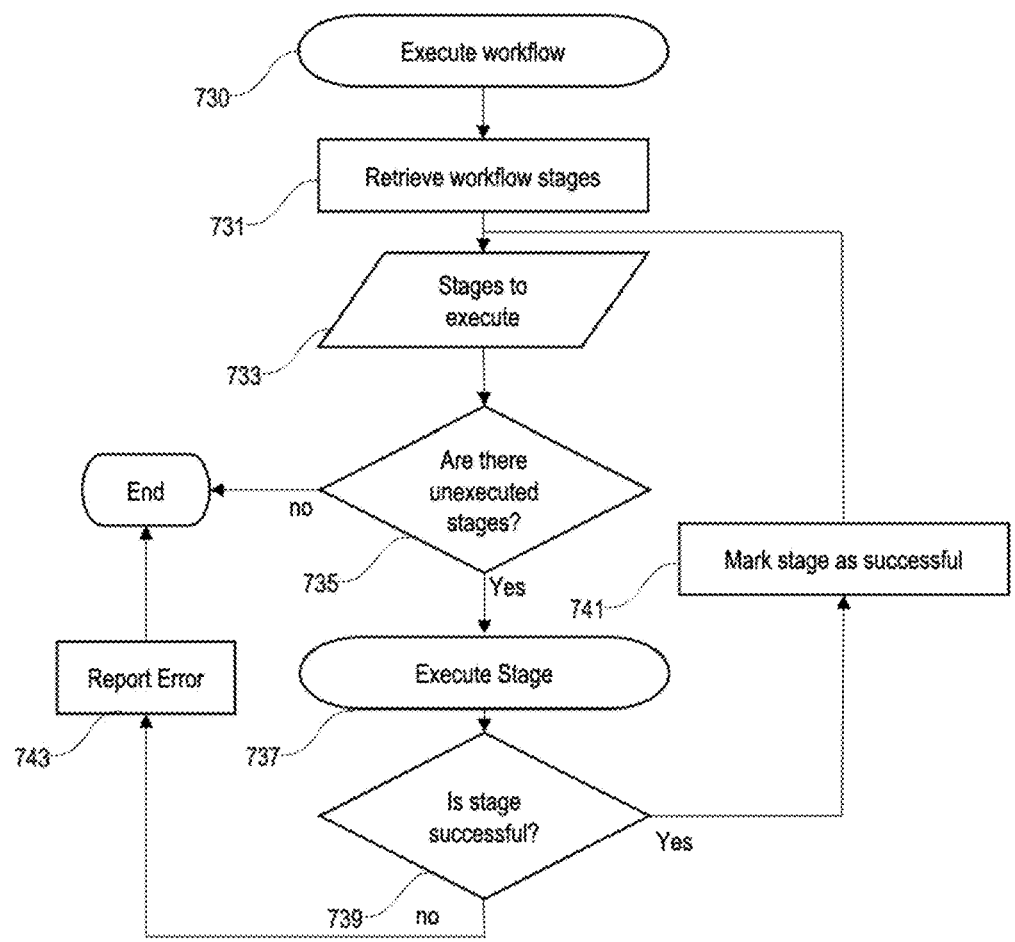
FIG. 7C is a flowchart of a method for workflow execution, in accordance with the exemplary embodiments.
Figure 7D:
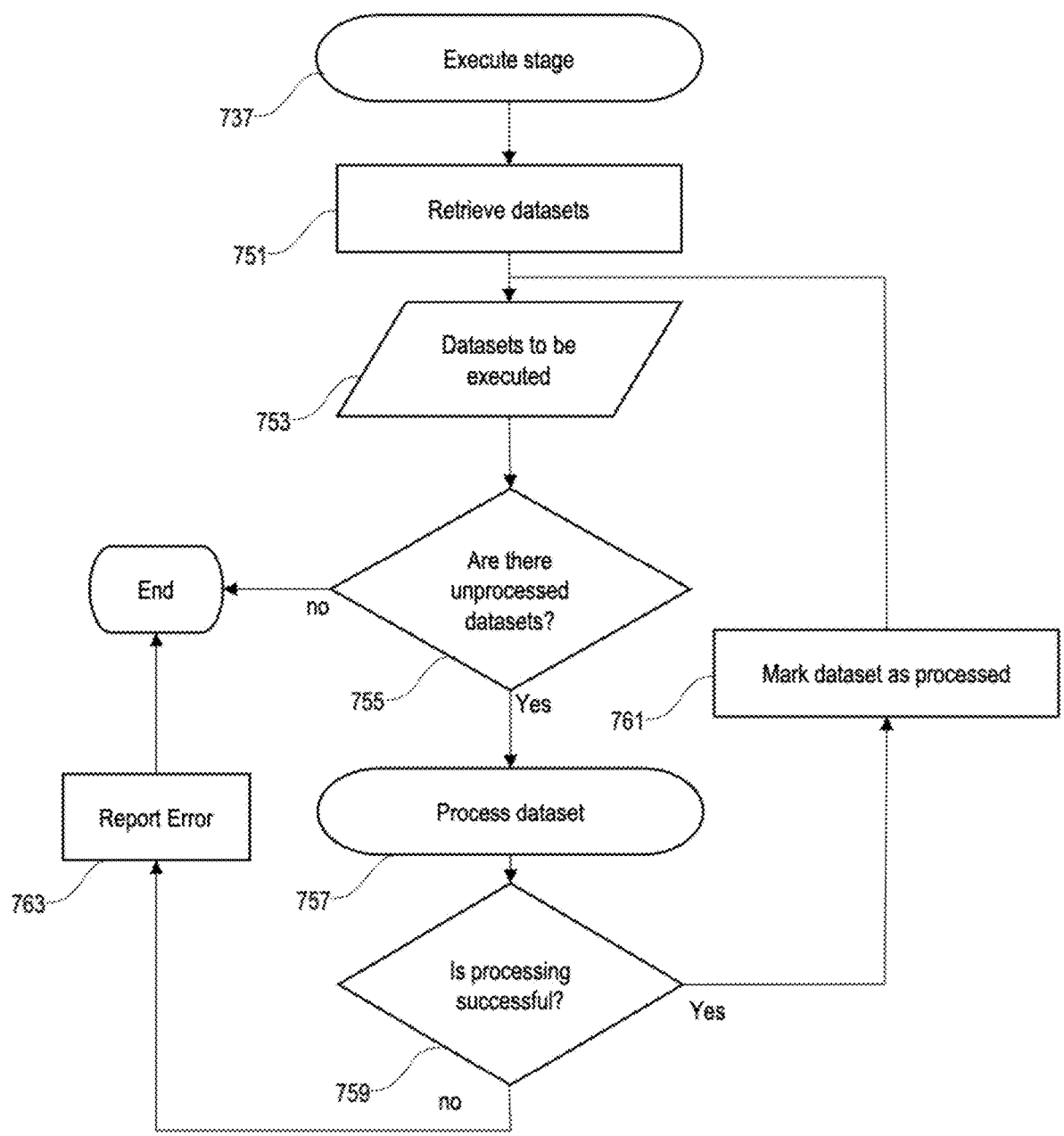
FIG. 7D is a flowchart of a method for workflow stage execution, in accordance with the exemplary embodiments.
Figure 7E:
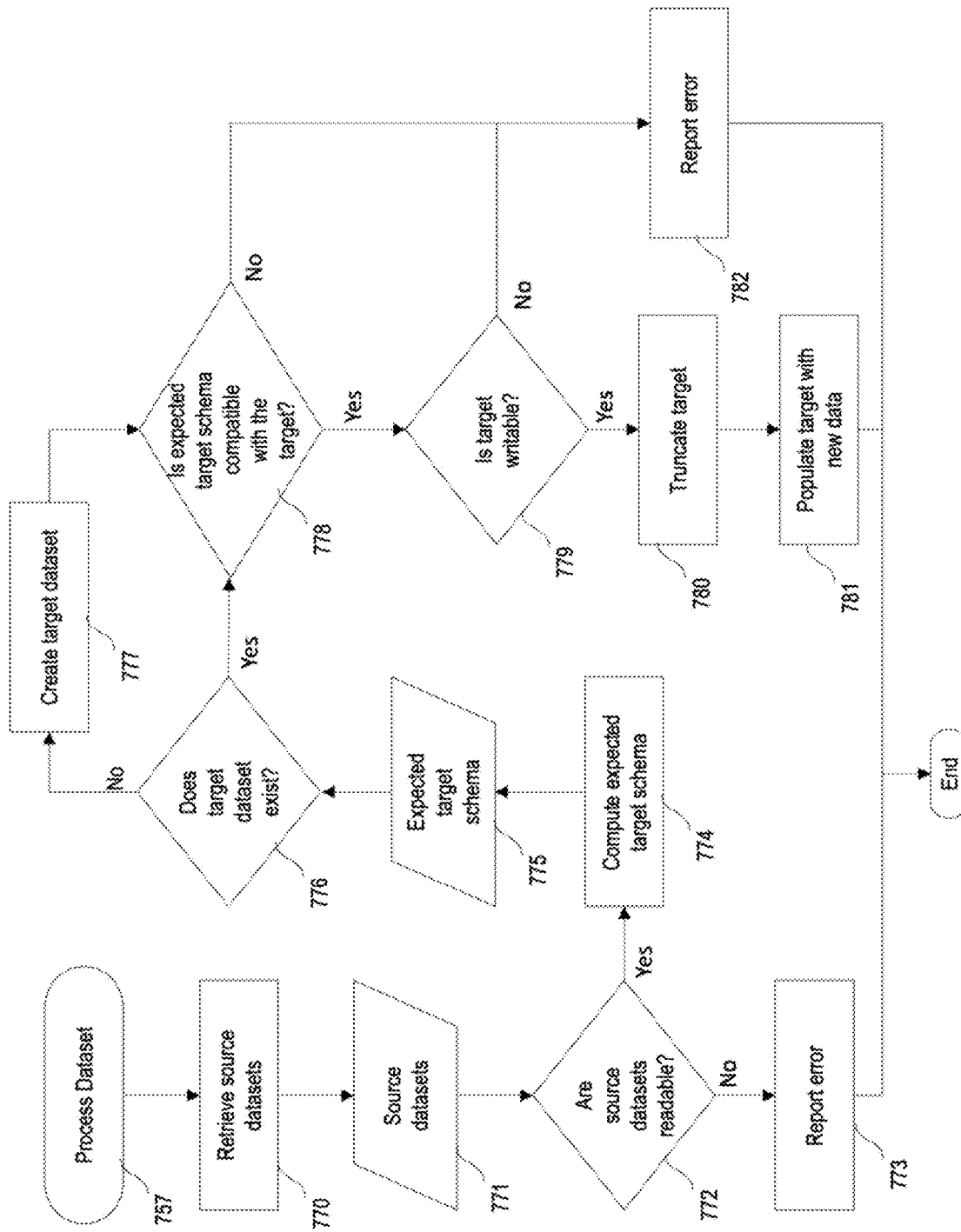
FIG. 7E is a flowchart of a method for processing a dataset, in accordance with the exemplary embodiments.

FIG. 7B shows an example of batches defined for the target dataset 424a. Three batches may be defined based on the dependencies. For example, the batch 723 comprises the target dataset 424a. The immediate dependencies of the target dataset 424a which are the source tables 421a and 421b belong to another batch 722. The source tables 442a and 442b on which depend the source tables 421a and 421b belong to another batch 721. Each of the batches 721 to 723 may be provided as a file that contains instructions that are processed as a unit on the tables of the batch. Tables within batches may be built in parallel as they may not have dependencies between each other. FIG. 7C is a flowchart of a method 730 for executing an ETL workflow having stages in accordance with an example of the present subject matter. The workflow stages 733 of the ETL workflow may be retrieved in step 731. Assuming for example, that the stages are sequential, it may be determined in step 735 whether there is an unexecuted stage of the workflow. In the case that there is no unexecuted stage of the workflow, the method ends. In the case that there is an unexecuted stage of the workflow, the method proceeds to step 737 where the stage is executed. It may be determined in step 739 whether the execution of the stage is successful. In the case that the execution of the stage is successful, the stage may be marked as successful in step 741 and steps 735 to 743 may be repeated for a next stage. In the case that the execution of the stage is not successful, a report error may be provided in step 743 and the method may end. The execution of the stage is further described with reference to FIG. 7D. The datasets 753 of the stage may be retrieved in step 751. Assuming for example that the datasets may be processed sequentially, it may be determined in step 755 whether there is an unprocessed dataset of the determined datasets. In the case that there is no unprocessed dataset of the determined datasets, the method ends. In the case that there is an unprocessed dataset of the determined datasets, the method proceeds to step 757 where the unprocessed dataset is processed. It may be determined in step 759 where the processing of the dataset is successful. In the case that the processing of the datasets is successful, the dataset may be marked as successfully processed in step 761 and steps 755 to 763 may be repeated for next determined datasets. In the case that the execution of the dataset is not successful, a report error may be provided in step 763 and the method may end. An example dataset processing method (step 757) is described with reference to FIG. 7E. One or more source datasets 771 that may need to be processed may be retrieved in step 770, if they are not already retrieved. It may be determined (step 772) whether the retrieved source datasets are readable. In the case that the source datasets 771 are not readable, a report error may be provided in step 773 and the method may end. In the case that the source datasets 771 are readable, an expected target schema 775 may be computed in step 774. It may be determined whether the target dataset exists in step 776. In the case that the target dataset does not exist, the target dataset may be created in step 777 and the method proceeds to step 778. In the case that the target dataset exists, the method proceeds to step 778. It may be determined in step 778 whether the target dataset is compatible with the expected target schema. In the case that the target dataset is not compatible with the expected target schema, a report error may be provided in step 782 and the method may end. In the case that the target dataset is compatible with the expected target schema, it may be determined in step 779 if the target dataset is writable. In the case that the target dataset is not writable, a report error may be provided in step 782 and the method may end. In the case that the target dataset is writable, the target dataset may be truncated in step 780 and populated in step 781 with new data that results from processing of the source datasets.

Figure 8A:
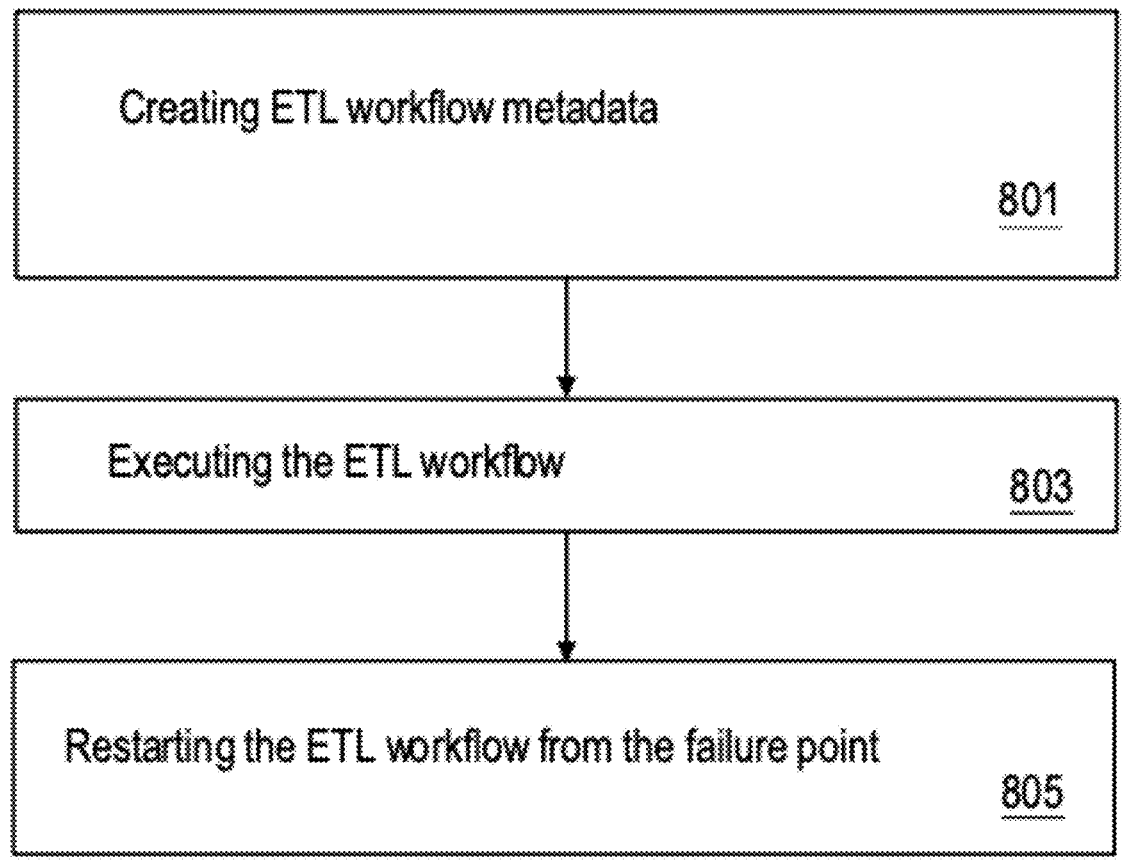
FIG. 8A is a flowchart of a method for executing the ETL workflow, in accordance with the exemplary embodiments.

FIG. 8A is a flowchart of a method for executing the ETL workflow in accordance with an example of the present subject matter. For the purpose of explanation, the method described in FIG. 8A may be implemented with the example defined in FIG. 4A-7A, but is not limited to this implementation.

Figure 8B:
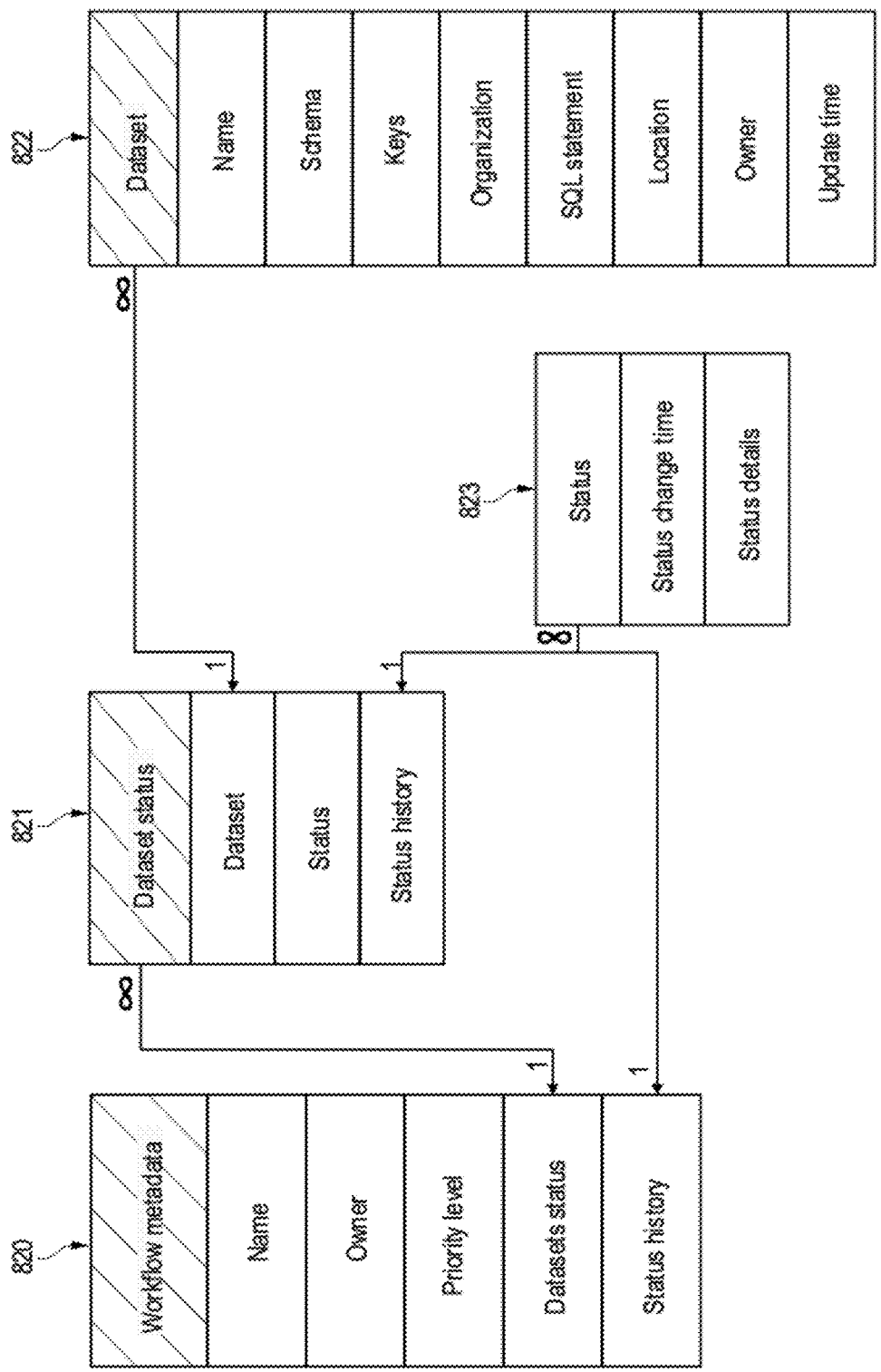
FIG. 8B depicts an example of the ETL workflow metadata, in accordance with the exemplary embodiments.

In step 801, an ETL workflow metadata may be created. The ETL workflow metadata comprises execution metadata indicative of the execution status of the ETL workflow and dataset metadata indicative of the execution status of each subset of the source dataset. FIG. 8B shows an example of the ETL workflow metadata. The execution metadata 820 may be indicative of the ETL workflow and may comprise the name of the workflow, the owner of the workflow, the priority level of the workflow, the status of datasets involved in the workflow, and the status history of the workflow. The status history 823 indicates the status change time and status details. Each of the datasets 822 involved in the workflow may be associated with respective dataset metadata (dataset status 821). The dataset metadata may for example comprise the table properties such as the name of the dataset, the schema of the dataset, the keys of the dataset, the organization of the dataset, the SQL statement to obtain the dataset, the location of the dataset, the owner of the dataset, and the update time of the dataset. The dataset metadata may further comprise the dataset status 821. The dataset status 821 may indicate the status history 823 of the dataset. As shown in FIG. 8B, the execution metadata 820 and the dataset metadata may be linked in accordance with a predefined structure that enables tracking of the evolution status of the workflow execution.

Figure 8C:
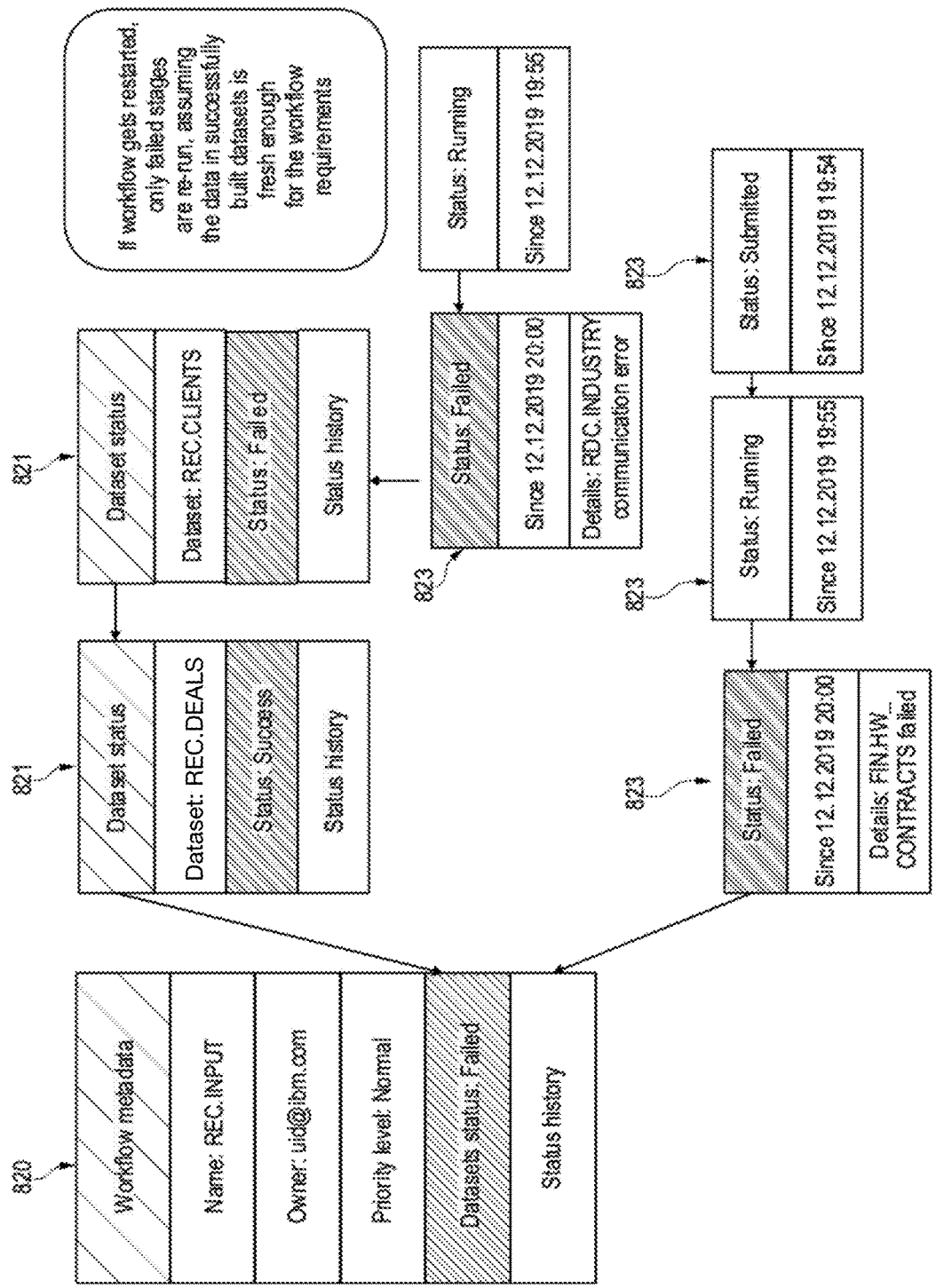
FIG. 8C is a block diagram illustrating a method for monitoring ETL workflow execution, in accordance with the exemplary embodiments.

In step 803, the ETL workflow may be executed, wherein the execution is monitored using the ETL workflow metadata. As shown in FIG. 8C, the execution metadata 820 indicates an execution failure due to failed dataset status. The dataset metadata may be used to identify the failed datasets. As indicated in FIG. 8C, the dataset status associated with the target dataset 424a is a successful one. However, dataset status associated with the target dataset 424b is a failed status. As shown in FIG. 8C, one or more instances of the status history 823 which are associated with each of the datasets and the ETL workflow indicate when the failure occurred, and which source tables are concerned.

Using the ETL workflow metadata, The ETL workflow may be restarted in step 805 wherein only failed stages are re-run, and assuming the data in successfully built datasets is fresh enough for the workflow requirements.

Figure 9:
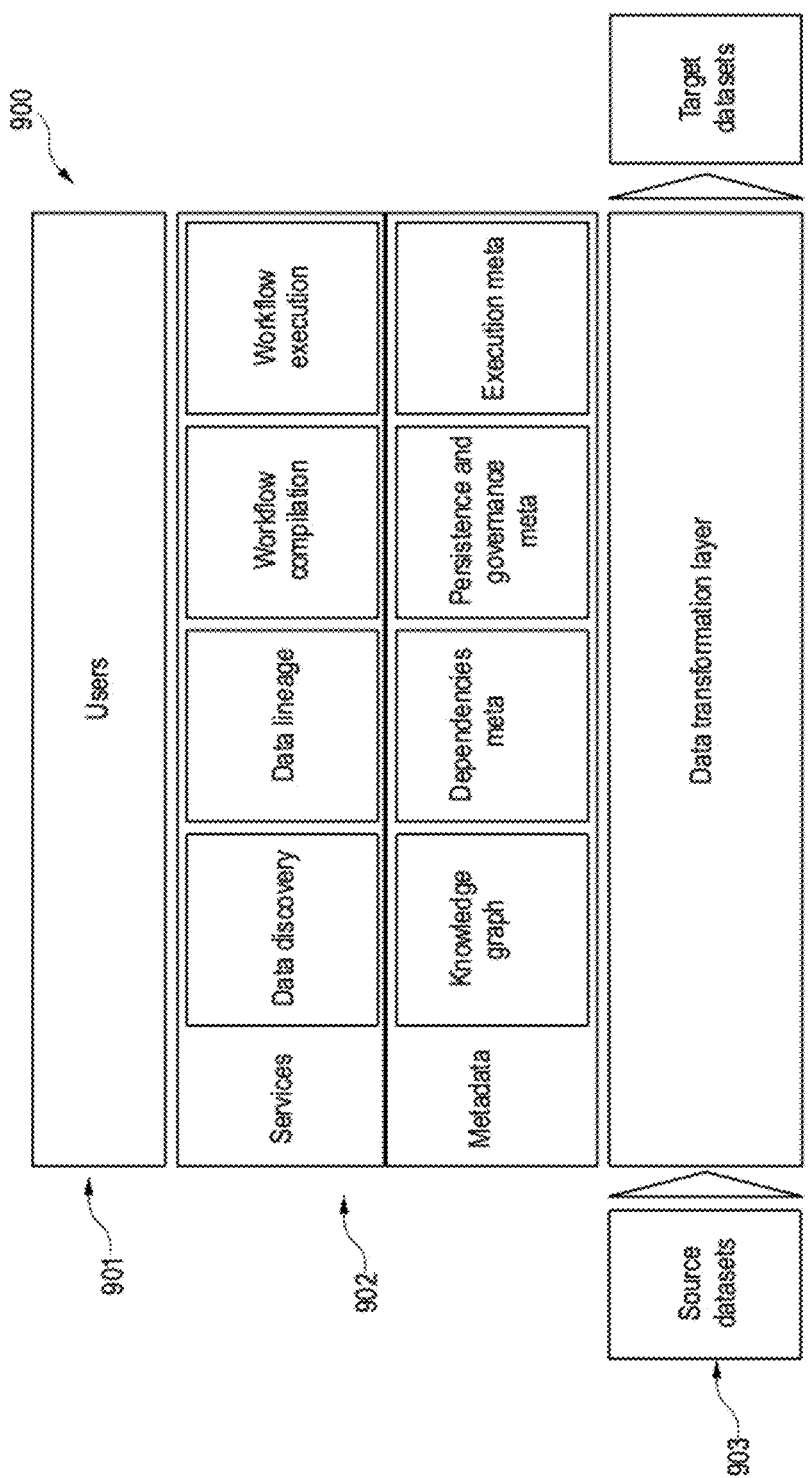
FIG. 9 is a block diagram of an execution environment, in accordance with the exemplary embodiments.

FIG. 9 is a block diagram of an execution environment 900 in accordance with an example of the present subject matter. FIG. 9 depicts a set of functional layers provided by the execution environment 900. The set of functional layers comprise a user layer 901, an ETL workflow generation layer 902 and an execution layer 903. The user layer 901 may include an ETL interface for receiving data analysis requests from users. The ETL workflow generation layer 902 comprises services and corresponding data input or output data. Each of the services may be configured to perform a respective step of ETL workflow generation method. For example, the data discovery service may be configured to identify the source datasets corresponding to received data analysis requests. The data lineage service may be configured to determine the data transformations corresponding to received data analysis requests. The workflow compilation service may be configured to build the ETL workflows. The workflow execution service may be configured to execute the ETL workflows using the execution layer 903. Any service of the services of ETL workflow generation layer 902 may potentially use any metadata of the listed metadata. For example, data discovery service may use governance metadata or execution status for ranking results.

Figure 10:
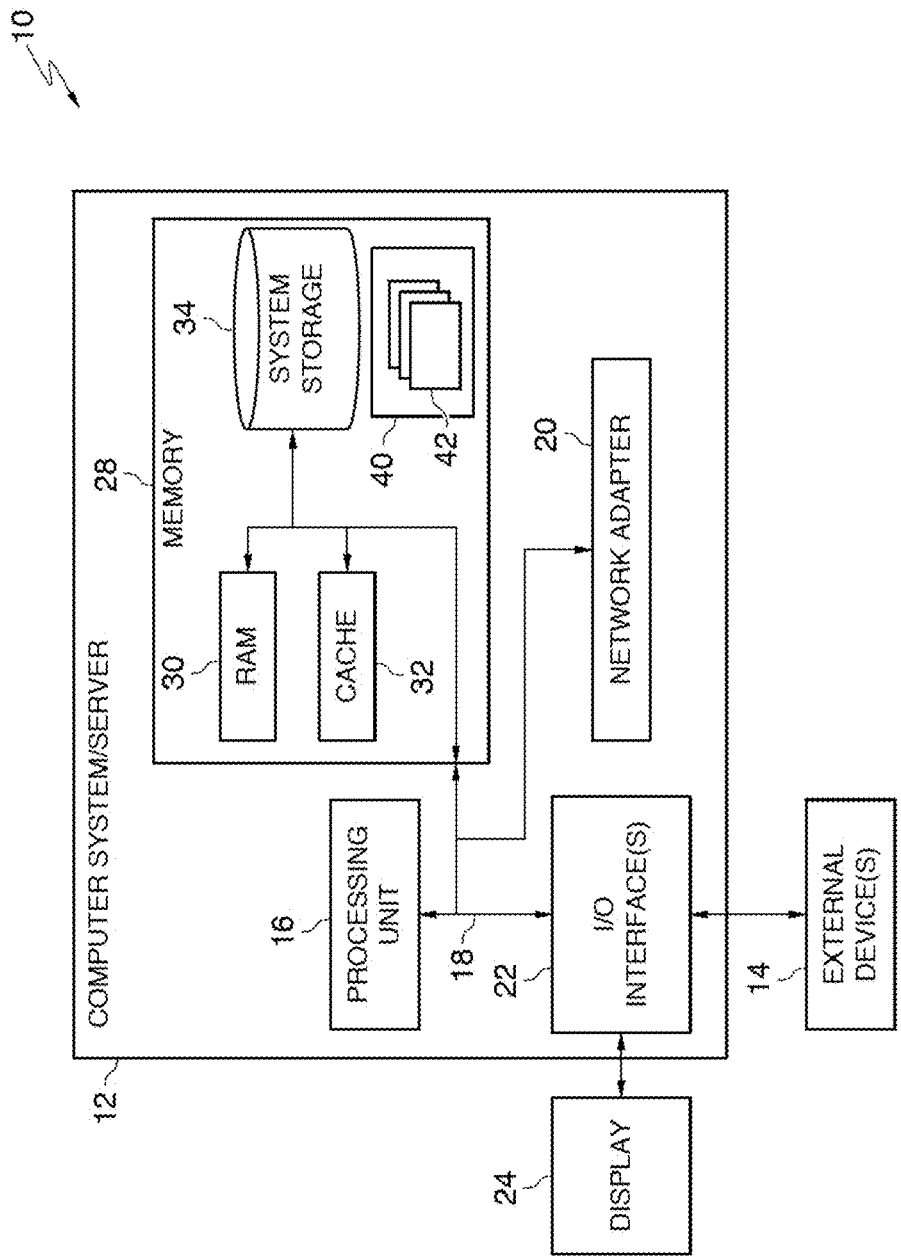
FIG. 10 depicts an exemplary block diagram of a computer system, in accordance with the exemplary embodiments.

FIG. 10 depicts a block diagram of devices within a system, in accordance with the exemplary embodiments. It should be appreciated that FIG. 10 provides only an illustration of one implementation and does not imply any limitations with regard to the environments in which different embodiments may be implemented. Many modifications to the depicted environment may be made.

Devices used herein may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11 are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used herein may also include a R/W drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Devices used herein may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Devices used herein may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware and software (stored on computer readable storage media 08 and/or ROM 06).

The programs described herein are identified based upon the application for which they are implemented in a specific one of the exemplary embodiments. However, it should be appreciated that any particular program nomenclature herein is used merely for convenience, and thus the exemplary embodiments should not be limited to use solely in any specific application identified and/or implied by such nomenclature.

Based on the foregoing, a computer system, method, and computer program product have been disclosed. However, numerous modifications and substitutions can be made without deviating from the scope of the exemplary embodiments. Therefore, the exemplary embodiments have been disclosed by way of example and not limitation.

It is to be understood that although this disclosure includes a detailed description on cloud computing, implementation of the teachings recited herein are not limited to a cloud computing environment. Rather, the exemplary embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 11:
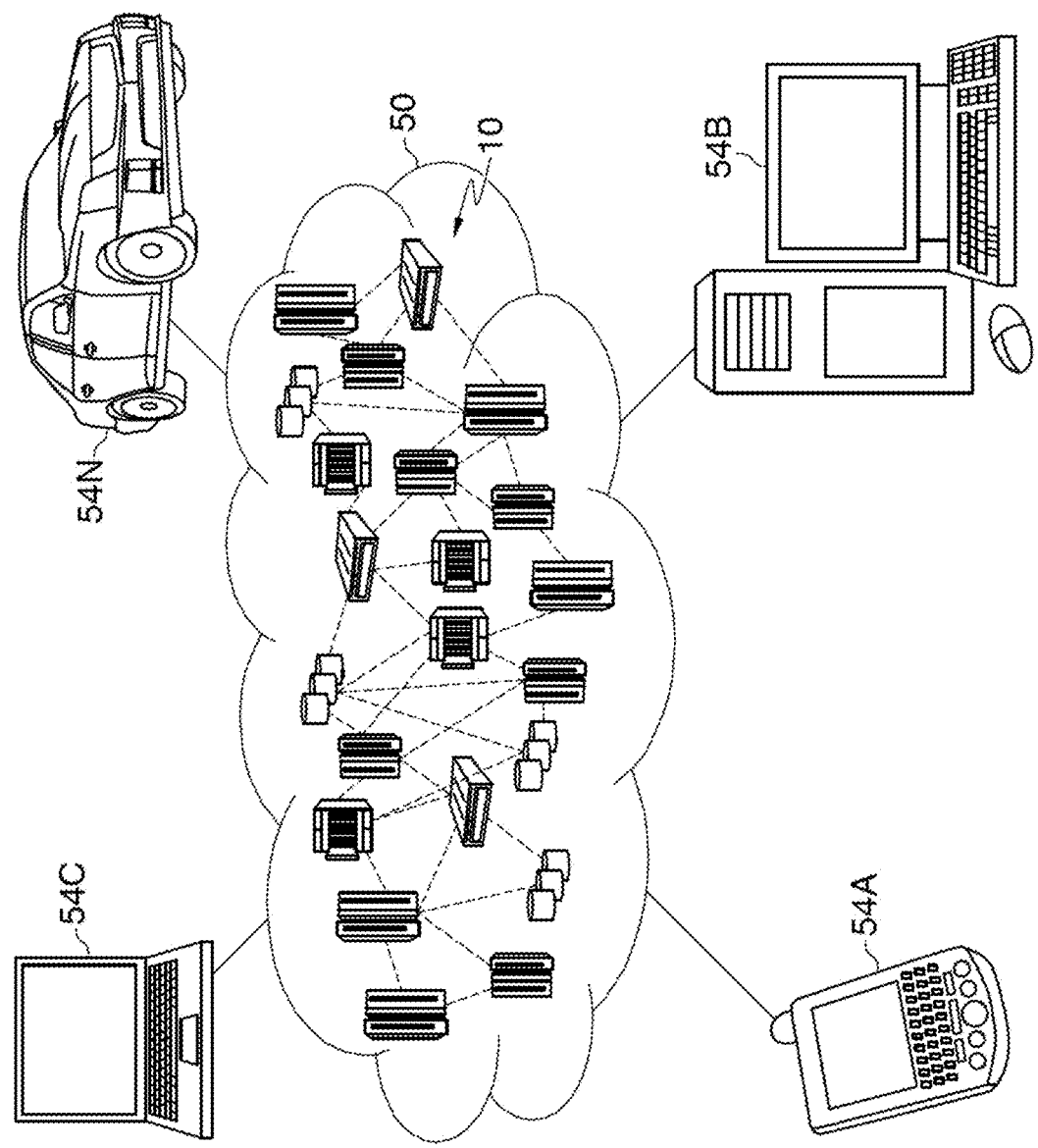
FIG. 11 depicts a cloud computing environment, in accordance with the exemplary embodiments.

Referring now to FIG. 11, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 11 are intended to be illustrative only and that computing nodes 40 and cloud computing environment 50 can communicate with any type of computerized device over any type of network and/or network addressable connection (e.g., using a web browser).

Figure 12:
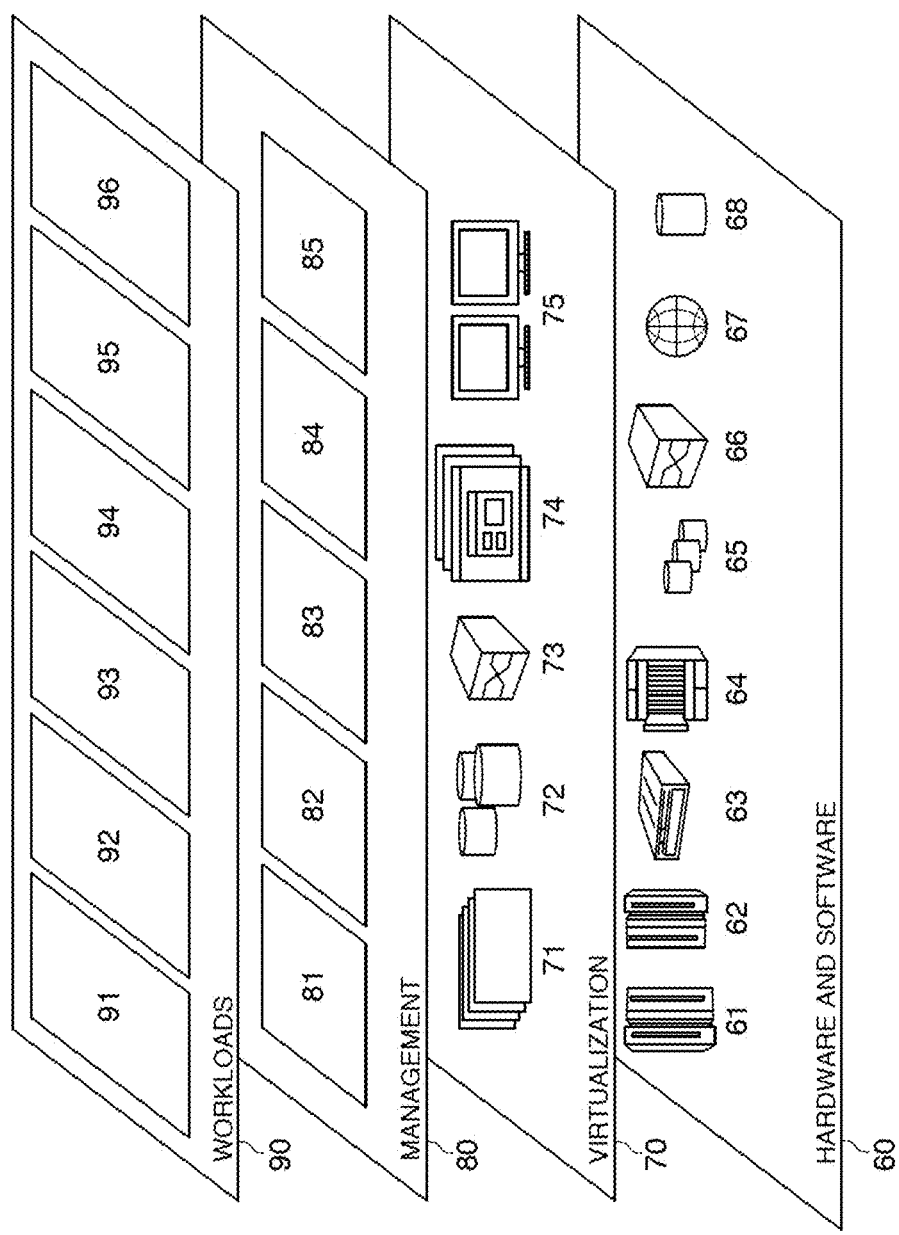
FIG. 12 depicts abstraction model layers, in accordance with the exemplary embodiments.

Referring now to FIG. 12, a set of functional abstraction layers provided by cloud computing environment 50 (FIG. 11) is shown. It should be understood in advance that the components, layers, and functions shown in FIG. 12 are intended to be illustrative only and the exemplary embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and automated extract, transform and load workflow generation 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method, the method comprising:
   receiving a data analysis request;
   using a knowledge graph for determining a source dataset based on the received data analysis request, wherein the knowledge graph represents an extract, transform and load (ETL) based ontology, wherein the knowledge graph comprises nodes representing entities and edges representing relationships between the entities, and wherein the entities are instances of concepts of the ETL based ontology;
   building an ETL workflow for processing the source dataset in accordance with a data lineage associated with the source dataset in the knowledge graph; and
   executing the ETL workflow.

2. The method of claim 1, wherein determining the source dataset based on the received data analysis request further comprises:
   performing natural language processing of the data analysis request; and
   determining the source dataset based on the processed data analysis request.

3. The method of claim 1, further comprising:
   incorporating the built ETL workflow into the knowledge graph as a property of the source dataset, as a property of a user submitting the data analysis request, as an entity related to a user, or as an entity related to the source dataset.

4. The method of claim 3, further comprising:
   receiving a second data analysis request;
   using the knowledge graph for determining a second source dataset based on the second data analysis request;
   building a second ETL workflow for processing the second source dataset in accordance with a data lineage associated with the second source dataset in the knowledge graph;
   identifying that the second ETL workflow shares one or more steps with the executed ETL workflow; and
   adapting the second ETL workflow such that it uses a result of the shared one or more steps within the executed ETL workflow.

5. The method of claim 1, wherein the knowledge graph is further indicative of data access rules associated with users and datasets, wherein the building of the ETL workflow comprises using the knowledge graph data to identify data access rules that apply to a user being a requester of the data analysis request or the source dataset, and wherein conditions for processing the source dataset in accordance with the identified data access rules are included in the ETL workflow.

6. The method of claim 5, wherein the data access rules comprise governance policies and user access rights.

7. The method of claim 5, wherein the identified data access rules indicate at least one of the items from the group comprising which part of the source dataset may be accessed from a location of the user, which part of the source dataset may be copied to a location of a target system, which target system is indicated in the data lineage, whether the user may write data to the target system, and whether the user may submit workloads.

8. The method of claim 1, wherein the building of the ETL workflow comprises:
   defining a target dataset in accordance with the data lineage, wherein the target dataset has immediate dependencies with the source dataset;
   determining a refresh rate of the source dataset, and
   refreshing the source dataset based on the determined refresh rate, wherein refreshing the source dataset comprises processing the source dataset in accordance with the ETL workflow, and wherein refreshing the source dataset uses all datasets dependent on the source dataset.

9. The method of claim 1, further comprising:
creating an ETL workflow metadata, wherein the ETL workflow metadata comprises execution metadata indicative of an execution status of the ETL workflow and dataset metadata indicative of an execution status of each subset of the source dataset; and
providing the ETL workflow metadata.

10. The method of claim 9, further comprising:
detecting an execution failure of the ETL workflow using the execution metadata, wherein one or more subsets of the source dataset are processed without failure before the detected execution failure occurred; and
performing a partial re-execution of the ETL workflow for processing non-processed subsets of the source dataset.

11. The method of claim 10, wherein the ETL workflow being performed is re-executed if the source dataset is not refreshed.

12. The method of claim 1, wherein the knowledge graph is generated using log data of ETL jobs of multiple ETL systems, and wherein the execution of the ETL workflow is performed on an ETL system that is part of the multiple ETL systems.

13. The method of claim 1, wherein the knowledge graph is generated using log data of ETL jobs of multiple ETL systems, and wherein the execution of the ETL workflow is performed on an ETL system that is not part of the multiple ETL systems.

14. A computer program product, the computer program product comprising:
one or more non-transitory computer-readable storage media and program instructions stored on the one or more non-transitory computer-readable storage media capable of performing a method, the method comprising:
receiving a data analysis request;
using a knowledge graph for determining a source dataset based on the received data analysis request, wherein the knowledge graph represents an extract, transform and load (ETL) based ontology, wherein the knowledge graph comprising nodes representing entities and edges representing relationships between the entities, and wherein the entities are instances of concepts of the ETL based ontology;
building an ETL workflow for processing the source dataset in accordance with a data lineage associated with the source dataset in the knowledge graph; and
executing the ETL workflow.

15. The computer program product of claim 14, wherein determining the source dataset based on the received data analysis request further comprises:
performing natural language processing of the data analysis request; and
determining the source dataset based on the processed data analysis request.

16. The computer program product of claim 14, further comprising:
incorporating the built ETL workflow into the knowledge graph as a property of the source dataset, as a property of a user being a requester of the data analysis request, as an entity related to a user, or as an entity related to the source dataset.

17. A computer system, the computer system comprising:
one or more computer processors, one or more computer-readable storage media, and program instructions stored on the one or more of the computer-readable storage media for execution by at least one of the one or more processors capable of performing a method, the method comprising:
receiving a data analysis request;
using a knowledge graph for determining a source dataset based on the received data analysis request, wherein the knowledge graph represents an extract, transform and load (ETL) based ontology, wherein the knowledge graph comprising nodes representing entities and edges representing relationships between the entities, and wherein the entities are instances of concepts of the ETL based ontology;
building an ETL workflow for processing the source dataset in accordance with a data lineage associated with the source dataset in the knowledge graph; and
executing the ETL workflow.

18. The computer system of claim 17, wherein determining the source dataset based on the received data analysis request further comprises:
performing natural language processing of the data analysis request; and
determining the source dataset based on the processed data analysis request.

19. The computer system of claim 17, further comprising:
incorporating the built ETL workflow into the knowledge graph as a property of the source dataset, as a property of a user being a requester of the data analysis request, as an entity related to a user, or as an entity related to the source dataset.

20. The computer system of claim 19, further comprising:
receiving a second data analysis request;
using the knowledge graph for determining a second source dataset based on the second data analysis request;
building a second ETL workflow for processing the second source dataset in accordance with a data lineage associated with the second source dataset in the knowledge graph;
identifying that the second ETL workflow shares one or more steps with the executed ETL workflow; and
adapting the second ETL workflow such that it uses a result of the shared one or more steps within the executed ETL workflow.

* * * * *